US012252878B2

(12) United States Patent
Bruns et al.

(10) Patent No.: US 12,252,878 B2
(45) Date of Patent: Mar. 18, 2025

(54) MODULAR CONFIGURABLE STRUCTURAL UNIT SYSTEM

(71) Applicant: THE BOLDT GROUP, INC., Appleton, WI (US)

(72) Inventors: Ben Bruns, Neenah, WI (US); Zach Lauria, Neenah, WI (US)

(73) Assignee: The Boldt Group, Inc., Appleton, WI (US)

( * ) Notice: Subject to any disclaimer, the term of this patent is extended or adjusted under 35 U.S.C. 154(b) by 783 days.

(21) Appl. No.: 17/308,759

(22) Filed: May 5, 2021

(65) Prior Publication Data

US 2022/0356698 A1 Nov. 10, 2022

(51) Int. Cl.

| | |
|---|---|
| ***E04B 1/348*** | (2006.01) |
| ***A61G 10/00*** | (2006.01) |
| ***E04H 3/08*** | (2006.01) |
| ***F24F 1/04*** | (2011.01) |

(52) U.S. Cl.

CPC .......... *E04B 1/34861* (2013.01); *A61G 10/00* (2013.01); *E04B 1/34869* (2013.01); *E04H 3/08* (2013.01); *F24F 1/04* (2013.01)

(58) Field of Classification Search

CPC ... E04B 1/34861; E04B 1/34869; E04H 3/08; E04H 1/1205; E04H 2001/1283

See application file for complete search history.

(56) References Cited

U.S. PATENT DOCUMENTS 3,540,173 A * 11/1970 Johnides .................. E04H 3/08 52/79.5
4,425,978 A 1/1984 Star
4,854,094 A * 8/1989 Clark .................... E04B 1/3483 52/234
5,727,353 A * 3/1998 Getz .................... A61B 6/4405 62/223
5,755,479 A * 5/1998 Lavin ...................... A61G 7/05 5/503.1
5,775,758 A * 7/1998 Eberspacher ............. B60P 3/14 296/19
6,179,358 B1 * 1/2001 Hirayama ................ B60P 3/14 296/24.38
6,243,993 B1 6/2001 Swensson
6,772,563 B2 8/2004 Kuhn
7,143,050 B2 11/2006 Crane (Continued)

FOREIGN PATENT DOCUMENTS

DE 10149046 4/2003
EP 1672144 6/2006

(Continued)

*Primary Examiner* — Paola Agudelo

(74) *Attorney, Agent, or Firm* — RYAN KROMHOLZ & MANION, S.C.

(57) ABSTRACT

A modular configurable multi-purpose system is provided. The system comprises at least one unit that has at least one room. The units are configured into at least one section, and arranged end to end or as called for in the application. A support section, having at least one support unit, may be provided for providing space for working, storage and other services for those working in the system. The system may be configured in numerous combinations to adapt to the immediate needs of the situation, and installed indoors and in the external environment. A method of operation of the system is provided.

10 Claims, 22 Drawing Sheets

(56) References Cited

U.S. PATENT DOCUMENTS

| | | | |
|---|---|---|---|
| 7,784,845 B2 | 8/2010 | Kim et al. | |
| 7,794,001 B2 | 9/2010 | Blackwell | |
| 7,985,382 B1 * | 7/2011 | Henry | E04H 1/1277 422/291 |
| 8,707,633 B2 | 4/2014 | Han et al. | |
| 9,308,141 B2 * | 4/2016 | Blackwell | B60P 3/14 |
| 9,516,944 B2 | 12/2016 | Lawrence | |
| 9,611,637 B2 | 4/2017 | Dynon | |
| 9,757,078 B1 | 9/2017 | Robertson | |
| 10,161,147 B2 | 12/2018 | Jornitz | |
| 10,167,645 B2 | 1/2019 | Geiger | |
| 10,407,897 B2 * | 9/2019 | Leibinger | E04H 3/08 |
| 10,492,970 B2 | 12/2019 | Merino et al. | |
| 11,773,613 B2 * | 10/2023 | Bruns | E04H 3/08 52/79.1 |
| 2008/0184631 A1 | 8/2008 | Schofield | |
| 2008/0221919 A1 | 9/2008 | Cates | |
| 2010/0139179 A1 | 6/2010 | Smith et al. | |
| 2011/0173898 A1 | 7/2011 | Denicourt et al. | |
| 2012/0265005 A1 * | 10/2012 | Han | E04H 3/08 600/21 |
| 2013/0152485 A1 * | 6/2013 | Austin | E04B 1/35 52/79.8 |
| 2013/0154296 A1 | 6/2013 | Blackwell et al. | |
| 2013/0233575 A1 | 9/2013 | McCoy et al. | |
| 2014/0116870 A1 * | 5/2014 | Kamen | E04H 3/02 202/83 |
| 2014/0298734 A1 * | 10/2014 | Rogers | E04B 1/34869 52/79.9 |
| 2015/0101264 A1 * | 4/2015 | Jornitz | E04H 3/08 52/79.9 |
| 2016/0010883 A1 * | 1/2016 | Jornitz | F24F 3/167 29/897.3 |
| 2016/0069062 A1 | 3/2016 | Dynon | |
| 2016/0128886 A1 * | 5/2016 | Merino | E04H 1/1277 600/21 |
| 2016/0333569 A1 * | 11/2016 | Johnston | E04H 1/005 |
| 2016/0348387 A1 | 12/2016 | Geiger | |
| 2017/0130447 A1 | 5/2017 | Lane, Jr. et al. | |
| 2018/0020823 A1 * | 1/2018 | Holmes | A61B 5/15142 600/573 |
| 2019/0136553 A1 | 5/2019 | Geiger | |
| 2019/0145118 A1 * | 5/2019 | Gauthier | E04H 1/125 52/79.1 |

FOREIGN PATENT DOCUMENTS

| | | |
|---|---|---|
| EP | 3091132 | 1/2016 |
| EP | 3263789 | 1/2018 |

* cited by examiner

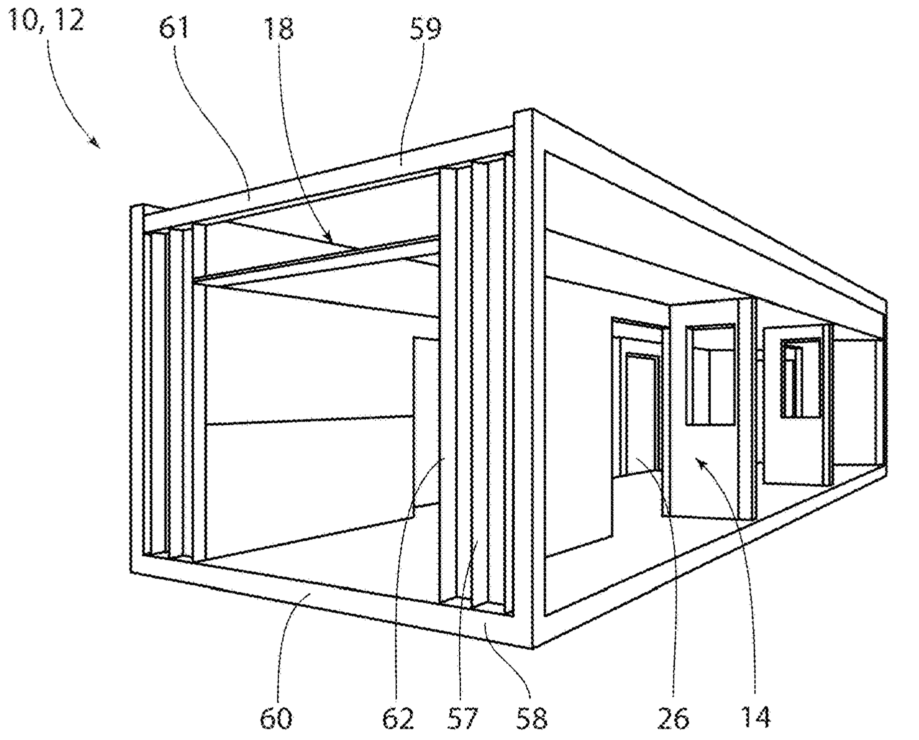
Fig. 2
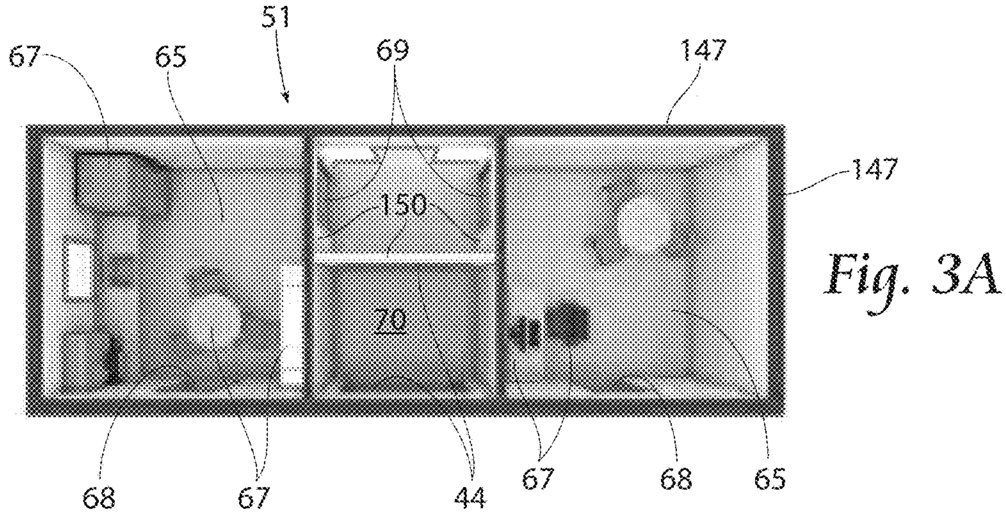
Fig. 3A
Fig. 3B
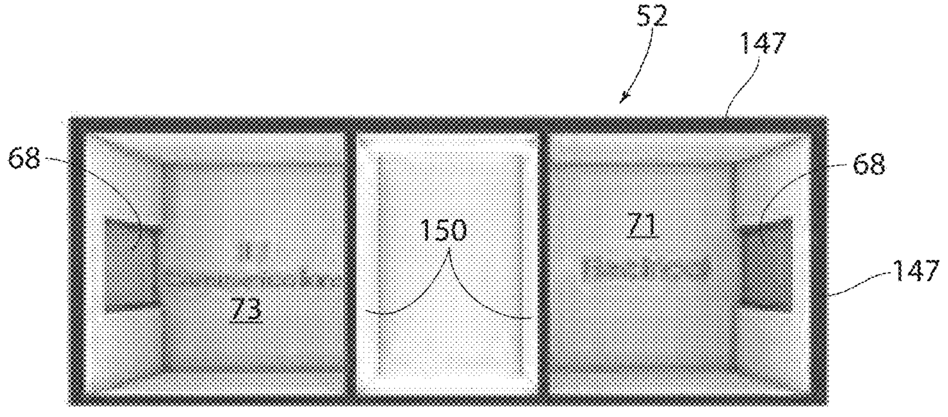

MODULAR CONFIGURABLE STRUCTURAL UNIT SYSTEM

FIELD OF THE INVENTION

The present disclosure generally relates to modular units. Most specifically the present disclosure relates to mobile multi-purpose units, and more specifically to modular configurable multi-purpose systems.

BACKGROUND OF THE INVENTION

Private and government entities are continuously under the strain of expanding services without the facilities to provide for such services. The services include hospital care, education, and controlled environment storage and/or operations.

The prior art illustrates inventions for mobile units. However, a number of such inventions are to units which are self-contained without the ability to create a modular system using multiple units. The prior art does disclose certain modular systems created from more than one unit. In both the case of self-contained units and modular units, a small number of the prior art illustrates that such units are transportable. Such transportation may be by tractor-trailer. However, some of the inventions of the prior art provide for mounting the unit upon trailer frames with axles. Further, the prior art illustrates that expandable areas are required due to the inability to fulfill the demands in a predefined space.

The prior art has provided for non-expandable modular units. The prior art illustrates such units are attached with a defined locking mechanism, thereby limiting the possible orientations of the units with respect to one another as well as the layout of completed modular unit systems. Using such mechanisms the prior art does not allow for non-common corridor/hallway units, patient care and support units, to be attached end to end. An end to end orientation of such units would provide for potential operations cost savings and more efficiency in movement between units. Finally, the prior illustrates the units are developed using container boxes or through the use of metal structural beams in a traditional frame structure. Finally, placing the people and machinery in a position of increased protection is paramount. Thus, the attachment of the units needs to go beyond just providing space for operations. This attachment needs to provide for a controlled environment of operations within the system.

A need exists for a modular unit system, which provides for combining the units to create a controlled environment of operation within the system.

A need exists for a modular unit system comprising units which are transportable upon a tractor-trailer flatbed.

A need exists for a modular unit system composed of non-common corridor/hallway area units.

A need exists for a modular unit system, which provides for combining the units in a manner not limited by the mechanism for combining the units.

A need exists tor a modular unit system comprising units made not exclusively of metal structural beams.

A need exists for modular units, which are prefabricated and provide for an expandable system.

A need exists for a modular system, which is able to be self-sufficient or connected to an existing electrical and air supply framework to provide an environmentally controlled system.

A need exists for separate patient care units to be attached end to end, optimizing costs and operations.

A need exists for immediate access to features at the unit.

A need exists for a method of operation ensuring efficient and safe operation of the system.

SUMMARY OF THE INVENTION

The modular configurable multi-purpose system comprises at least one unit. The system is configured with at least one variation of a unit, which comprises at least one of partitioned rooms and a common room. The units are configured into at least one section.

The system may comprise units forming a support section, wherein such units are support units. The support units may be provided for providing space for working, storage and other services for those working in other areas of the system. The supports units may be composed of alternative variations.

The system is configured such that units are attached to one another to create a seal providing for a controlled environment of operation, which includes arresting and managing the movement of airborne and non-airborne particles into and out of the system.

The system is configured such that units can be paired end to end.

The system is configured such that support units are attached to one another to create a seal providing for a controlled environment of operation, which includes arresting and managing the movement of airborne and non-airborne particles into and out of the system.

The system is configured such that operations sections and support sections are attached to one another to create a seal providing for a controlled environment of operation, which includes arresting and managing the movement of airborne and non-airborne particles into and out of the system.

The system may be configured in numerous orientations to adapt to the immediate needs of the situation.

The system may be installed indoors and in the external environment.

The system is designed such that orientation of the units may create common corridor/hallways of the system.

The units are designed to be transportable using a tractor-trailer flatbed, a train, an airplane, or a helicopter.

The system is designed to provide for units defined by an open sided box-frame, where the box-frame defines the possible location of wall frame structured walls, but might also be held open. As such the members of the box-frame, potentially together with the elements comprising the roof, ceilings, floors and walls, create a seal with a paired unit when such are attached to one another. This seal provides for the controlled environment as discussed. Alternatively, walls of the units are a frame structure comprised of beams made of at least one of fibrous material and metal. The walls of paired units create a seal providing for the controlled environment as discussed.

A method of operation of the system is described to ensure efficient and safe operation of the system.

An intended benefit of the invention provides for combining the units to create a controlled environment of operation within the system.

An intended benefit of the invention provides for a modular unit system comprising units, which are transportable upon a tractor-trailer flatbed.

An intended benefit of this invention provides for a system composed of non-common corridor/hallway area units.

An intended benefit of this invention provides for combining the units in a manner not limited by the mechanism for combining the units.

An intended benefit of this invention provides for a modular unit system comprising units made not exclusively of metal structural beams.

An intended benefit of this invention provides for modular units, which are prefabricated and provide for an expandable system.

An intended benefit of this invention provides for a modular system, which is able to be self-sufficient or connected to an existing electrical and air supply framework to provide an environmentally controlled operations.

An intended benefit of this invention provides for separate units to be attached end to end.

An intended benefit of this invention provides for immediate access to features at the unit.

An intended benefit of this invention provides for a method of operation ensuring efficient and safe operation of the system.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 2 is a perspective view of a unit of the system during construction of the unit.

FIG. 3A is a top view of a first support unit of the system.

FIG. 3B is a top view of a second support unit of the system.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is described in the specification.

Solutions have been provided in mobile multi-purpose systems, with some using multiple units in a modular configuration. However, the configurations of such prior art units is limited to specific configurations. Further, the prior art systems require a separate common corridor/hallway unit for construction of the system. The costs associated with such limitations reduce the benefit of the modular system. The units of the present invention are configurable along a transverse axis of the unit. The combinations of the units creates a seal, this seal provides for a controlled environment of operation within the system. Additionally, the units are combined without the need for a locking mechanism. This allows for the system to be expandable. The units are transportable upon a tractor-trailer flatbed, airplane or train car reducing transportation cost per unit. The system is a separate unit, which is stand alone or attached to an existing structure, and therefore has specific locations for personnel to immediately access personal protection features. Thus, the present invention has optimized the efficiency of multi-purpose unit operations, provided greater options in building layout for expanded units, and reduced the costs associated with such operations.

Figure 1A:
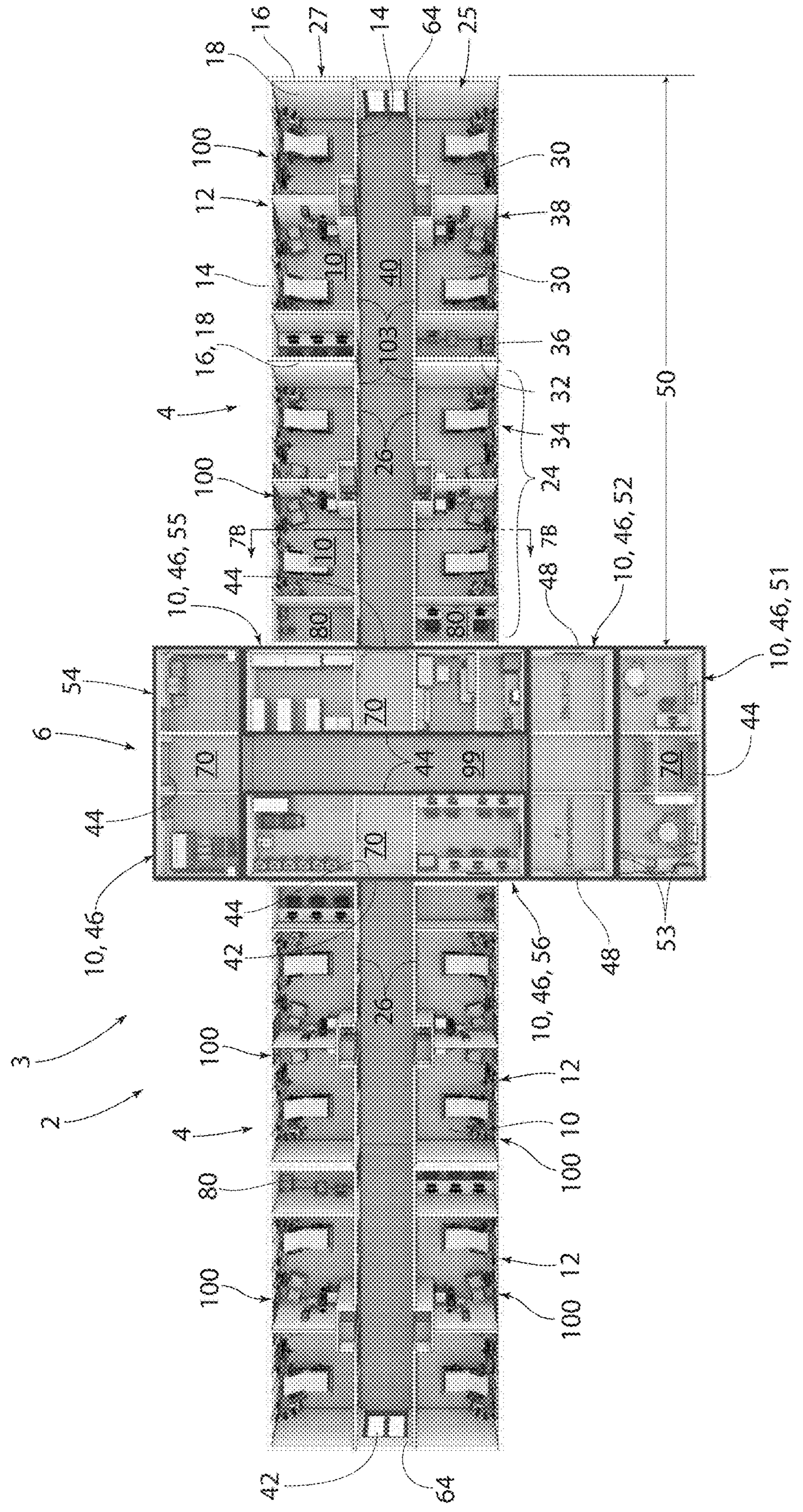
FIG. 1A is a top view of a tier of the modular configurable multi-purpose system of the invention.

With attention to FIG. 1A, an example of a first variation of a tier 3 of the modular configurable multi-purpose system 2, which may be a hospital system, is illustrated. The system 2, and tier 3, is a modular system comprising multiple units 10 which shall be described. As later described, it is understood that more than one tier 3 may comprise the system 2. The combination of such units allows for optimization of costs and patient care. The system 2, and tier 3, may comprise one or more units 10. Further, the orientation of the units 10 with respect to one another can be changed to meet both dimensional requirements, patient care requirements and other business and environmental factors.

The system 2, and tier 3, comprises two patient care sections 4 separated by a support section 6. The connection between the patient section and the support section creates a seal. This seal provides for controlling the environment of operation within the system, which includes arresting and managing the movement of airborne and non-airborne particles into and out of the system, air distribution within the system and temperature control within the system. Each patient care section 4 comprises at least one patient care unit. 12. Each patient care unit 12 has a rectangular shape or floorplan. Alternatively, the unit 12 may have a square shape or floorplan. Each patient care unit 12 has parallel long axis sides 14 separated by oppositely opposed transverse sides 16, forming the ends 18 of the patient care unit 12. In the example of the system 2 illustrated in FIG. 1A, each patient care section 4 comprises four patient care units 12. Along one long axis side 14 of each patient care unit 12, two patient care room doors 26 open into the patient care unit 12. Specifically, each door 26 opens into a separate patient care room 30 of the patient care unit 12. The patient care units 12 of the system 2, and tier 3, are a first variation of the patient care unit 100. The first variation of the patient care unit 100 is an airborne infectious isolation unit or intensive care unit. At least one room 30 of the unit 100 may be a critical care airborne infectious isolation room for the care of patients including patients with infectious conditions in order to prevent the spread of aerosol infections. As later described, the first variation of the tier 3 may provide for negative pressure to at least one room 30.

The four patient care units 12 of the of each patient care section 4 illustrated in FIG. 1A, are separated into two patient, care subsections 24. The patient care section is created in a manner which creates a controlled environment, as referenced, within the patient section. The patient care units 12 of each subsection 24 are aligned such that a first end 32 of a first patient care unit 34 is aligned with a second end 36 of a second patient care unit 38. The attachment of the patient care units creates a seal, and control of the system environment as referenced, which manages and arrests particulate flow in and out of the system, and manages temperature and airflow within the system. Further, the patient care units are attached to one another without the need for connecting mechanism. The alignment provides for the doors 26 of the first and second patient care units (34, 38), patient care rooms 30 of the respective patient care units (34, 38), to be on the same side, service side 103, of the patient care subsection 24. A second patient care subsection 25 is positioned at least substantially parallel to a first patient care subsection 27 along the long axis side 14 of the patient care units 12 to create the patient care section 4. The doors 26 of the respective patient care subsections (24, 25, 27) face one another and into a corridor space 40 separating the respective patient care subsections (24, 25, 27). The corridor space 40 extends at least substantially a patient care section length 50 of the patient care section 4. The corridor space 40 is the common hallway of the patient care section 4, allowing for access to the individual rooms 30. Located at least in close proximity to at least one end of the corridor, an access door 42 provides entry and exit into the corridor 40 and the patient care section 4. The patient care sections 4 are positioned with the support section between the patient care sections. An access door 42 of the corridor 40 of each patient care section 40 is in at least substantial alignment with a support unit access door 44 of the support section 6.

Figure 1B:
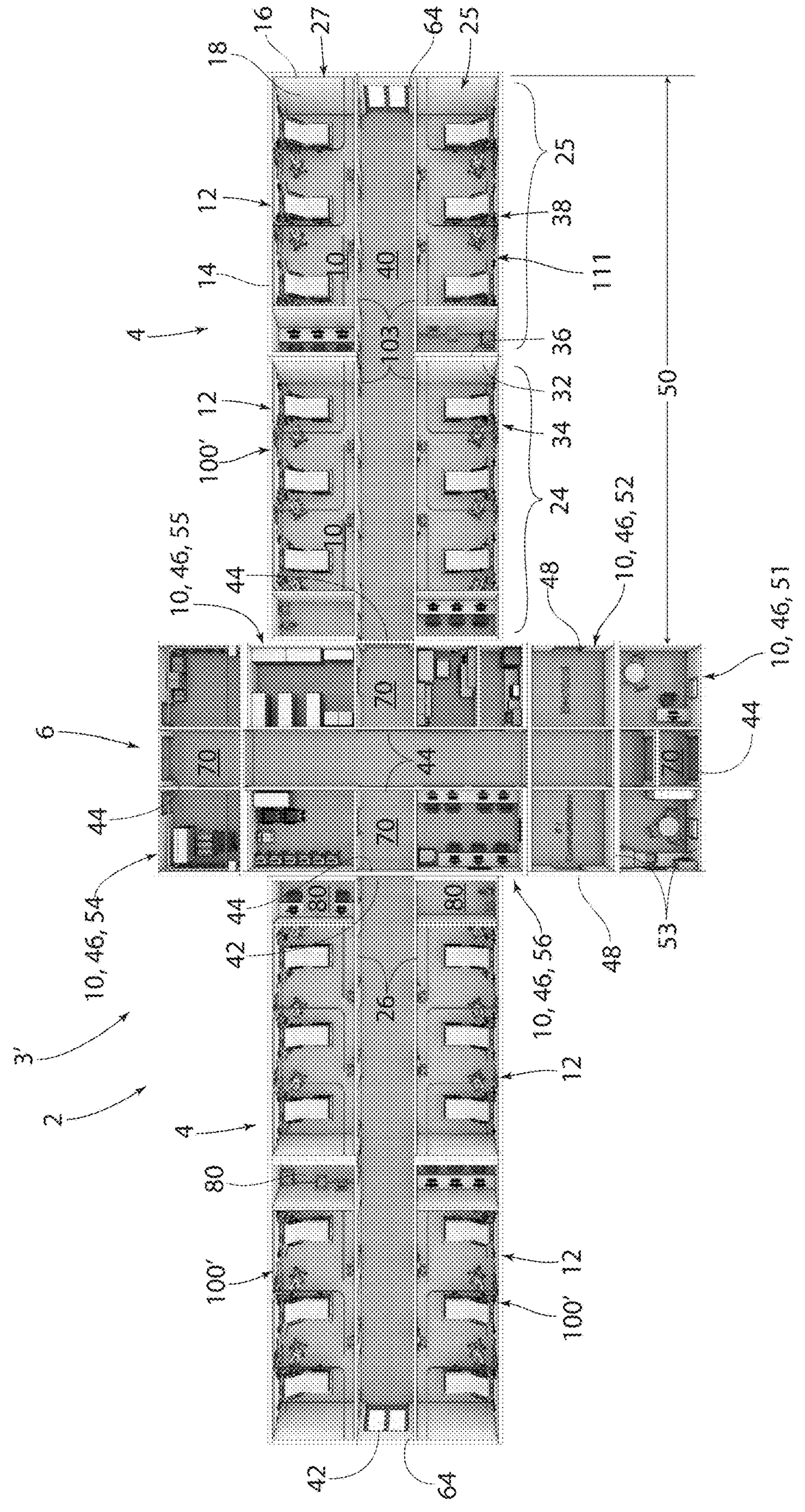
FIG. 1B is a top view of an alternate tier arrangement of the modular configurable multi-purpose system of the invention.

With attention to FIG. 1B, a second variation of the tier 3' of the modular configurable multi-purpose system 2 is illustrated. The second variation of the tier 3' of the system 2 comprises at least one component of the first variation of the tier 3 of the modular configurable multi-purpose system 2. Further, the patient are units 12 of the second variation of the tier 3' of the system 2 are a second variation of the patient care unit 100'. The second variation of the patient care unit 100' is an open ward. The second variation of the patient care unit 100' preferably lacks the doors 26 of the first variation 100. Alternatively, the second variation of the patient care unit 100' may have at least one door entering into the unit 100 patient ward area. As later described, the second variation of the tier 3' may provide for negative pressure to at least one ward 111.

Figure 1C:
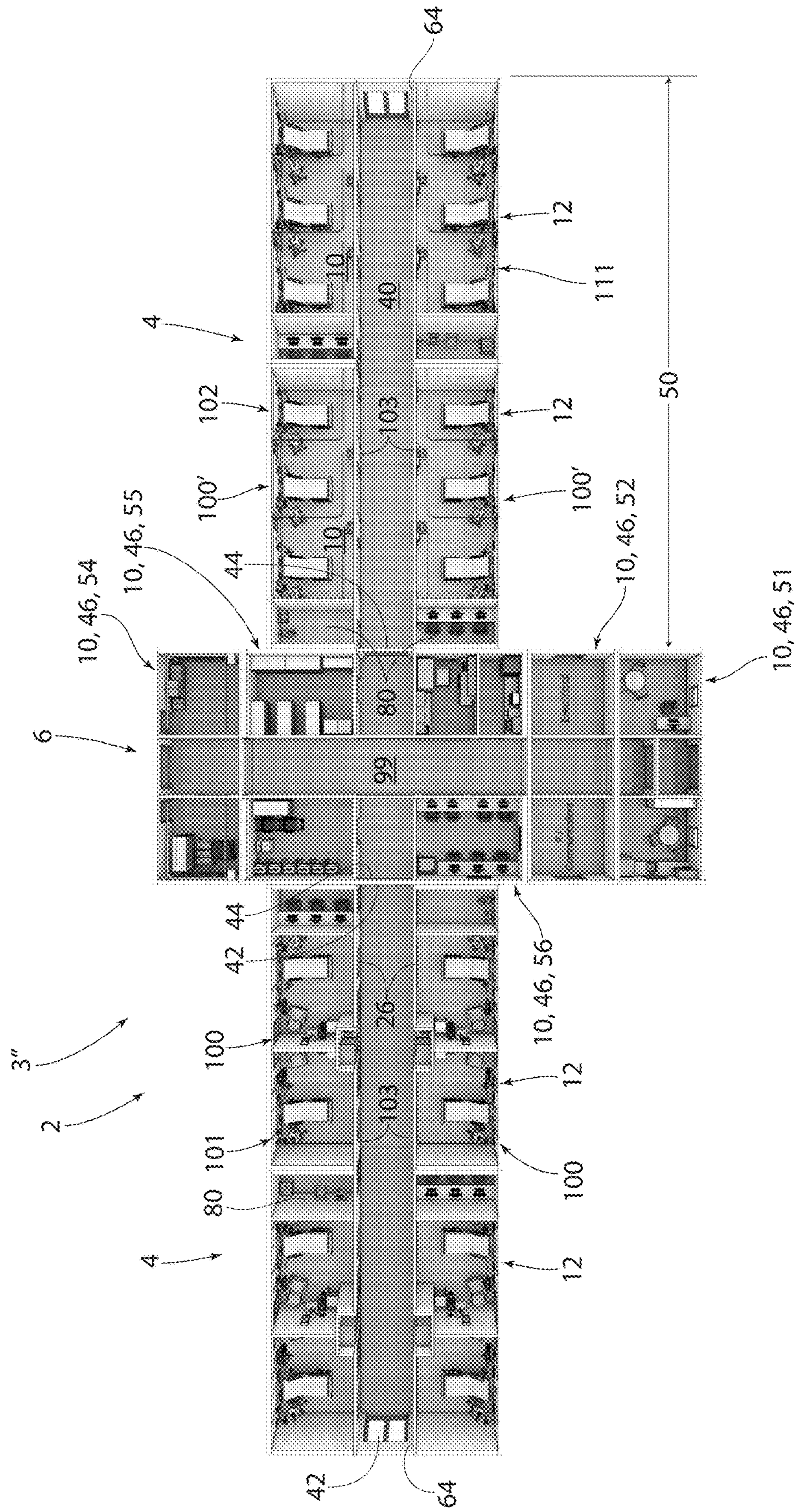
FIG. 1C is a top view of a further tier arrangement of the modular configurable multi-purpose system of the invention.

With attention to FIG. 1C, a third variation of the tier 3" of the modular configurable multi-purpose system 2 is illustrated. The third variation of the tier 3" of the system 2 comprises at least one component of the first variation of the tier 3 of the system 2. The third variation of the tier 3" of the system 2 comprises at least one component of the second variation of the tier 3' of the system 2. Further, a first patient care section 101 of the tier 3" of the system 2 comprises at least one, preferably four, first variations of the patient care unit 100. A second patient care section 102 of the tier 3" of the system 2 comprises at least one, preferably four, second variations of the patient care unit 100'. As later described, the third variation of the tier 3" may provide for negative pressure to at least one of at least one ward 111 and at least one room 30.

It is understood a patient care section 4 may comprise less than four patient care units 12. It is understood a patient care section 4 may comprise more than four patient care units 12. It is understood a patient care subsection 24 may comprise one patient care unit 12. It is understood a patient care subsection 24 may comprise more than two patient care units 12. It is understood the patient care section 4 may not comprise a corridor 40. An intended benefit of this invention provides for a system 2 composed of non-common corridor/hallway area units 10.

In the examples of the tiers (3, 3', 3") of the system 2, illustrated in FIGS. 1A to 1C, the support section 6 comprises five support units 46. The description of the support units shall follow. The support units 46 of the support section 6 are oriented to any number of ways Lo meet the requirements presented. The orientation and attachment of the support units is a sealed connection providing for environmentally controlled operations within the system, as previously described. The support units are connected to one another without a connection mechanism. The examples illustrated in FIGS. 1A to 1C illustrate the support section 6 comprises a support section long axis side 48 orthogonal to the long axis sides 14 of the patient care units 12. At least one support unit 46 preferably has a rectangular shape. Alternatively, at least one support unit 46 has a square shape. At least one support unit 46 comprises at least one, preferably two, support unit access doors 44. Alternatively, at least one support unit 46 may comprise less than one support unit access door 44. Preferably, the support unit access doors 44 of each support unit 46 are positioned along at least one support unit long axis side 53 of the respective support unit

46. Alternatively, the support unit access doors 44 of each support unit 46 are positioned along any side of the respective support unit 46. The access door 44 provides access into the support unit 46 or the support section 6 in general.

As illustrated in FIGS. 1A to 1C, a first support unit 51 and second support unit 52 are positioned such that the long axis sides 53 of the respective support units (51, 52) is orthogonal to the support section long axis sides 48, and parallel to one another (51, 52) and contacting one another along a long axis side 53 of each unit (51, 52). A third support unit 54 is parallel to the first and second support units (51, 52) and separated from the first and second support units (51, 52) by oppositely opposed fourth support unit 55 and fifth support unit 56. A common support area 99 is provided for by the orientation of the second 52, third 54, fourth 55 and fifth 56 support units with respect to one another.

With attention to FIG. 2, the construction of a unit 10 of the system 2 is illustrated. In particular, the construction of a patient care unit 12 is illustrated. The ends 18 and long axis sides 14 of the respective patient care unit 12 are each constructed in a framed construction 57. The framed construction illustrated in FIG. 2, provides that each respective wall (14, 18) of the unit (10, 12) comprises at least one footing member 58 at a base 60 of the unit (10,12) and at least one head member 59 at or in close proximity to a top 61 of the unit (10, 12). The foot member 58 and head member 59 are separated by and connected with at least one support beam 62 spaced at predetermined distances from one another. The doors 26 are constructed within at least one wall at predetermined locations. It is understood that at least one of the footing member 58, head member 59, and support beam 62 may be constructed of at least one of a fibrous material, such as wood, and a metallic material. It is further understood that all units 10 of the system 2 may be constructed in at least one of a similar manner and using structural components (58, 59, 62, 63) as previously described. It is understood that connection walls 64 (see FIG. 1C) may be constructed in at least one of a similar manner and using structural components as previously described (58, 59, 62). It understood all possible construction materials and methods of structures and combinations of materials and methods may be used in the construction of the units 10 and the system 2. An intended benefit of this invention provides for a modular unit system 2 comprising units made not exclusively of metal structural beams (58, 59, 62). An intended benefit of this invention provides for modular units 10 which are prefabricated and provide for an expandable system (2, 2' 2"), and configurable in any manner to meet the present demands.

With attention to FIG. 3A, the first support unit 51 of the system 2 is described. The unit 51 comprises at least one preferably two office spaces 65. The offices spaces shall be furnished with various amenities 67 to assist in the functions at hand. Such amenities 67 may include cabinets, tables and chairs, and computers. The unit comprises support unit access doors 44 for access to the unit 51 as previously described. The unit 51 comprises a separation room 70 between the access doors 44 of the unit 51. The room 70 may be used as a decontamination room. Such room may be pressurized, above or below the outside environment pressure, to assist in the control of the atmosphere within the system 2 as compared to an attached patient care section 4 or the outside environment. The unit additionally comprises at least one individual access door 68 allowing for personnel to and from the outside environment. The unit 51 addition comprises internal access doors 69 for access to the various offices spaces 65 within the unit 51.

With attention to FIG. 3B, the second support unit 52 of the system 2 is described. The unit 52 comprises at least one communications room 73 for housing hardware and software for the communications structure of the system 2. The unit 52 comprises at least one electrical room 71 for housing the electrical framework of the system 2. The unit additionally comprises at least one individual access door 68 allowing for personnel to and from the outside environment. In FIG. 3B, each of the communications room 73 and the electrical room 71 is provided with an individual access door 68. The unit 52 may be provided with access doors 44.

Figure 3C:
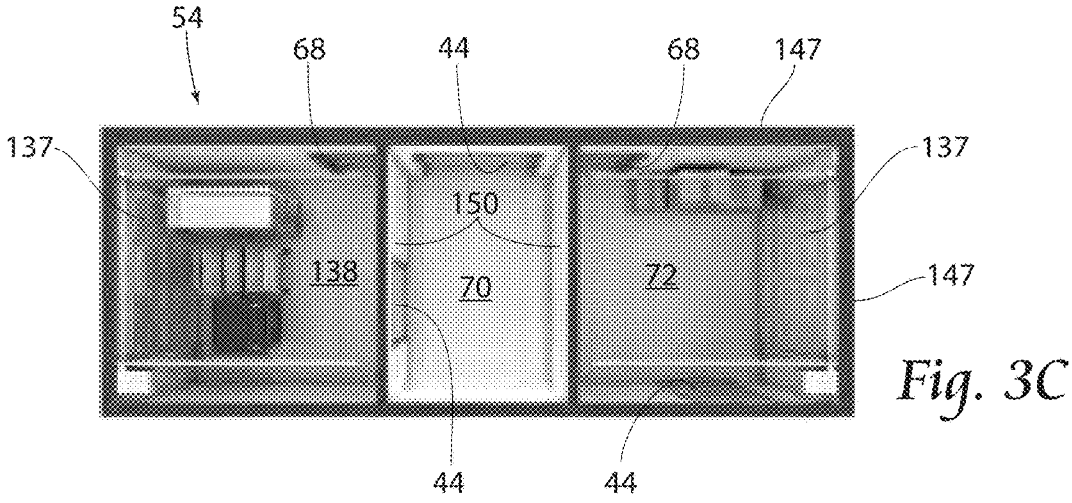
FIG. 3C is a top view of a third support unit of the system.

With attention to FIG. 3C, the third support unit 54 of the system 2 is described. The unit 54 comprises a clean loading dock 72 with a maintenance access door 137. The clean loading dock 72 provides for entry of materials and equipment into the system 2. The unit 54 provides for a waste removal dock 138 with an access door 137, for removal of waste from the system 2. It is important to note that personnel and staff are unable to transfer between the docks 72, 138) of the unit 54 for sanitary and contamination prevention purposes. The waste removal dock 138 comprises a door 44 as previously described which enters at least one separation room 70 positioned between the docks (72, 138). As illustrated, at least one of the docks (72, 138) comprises a door 68, as previously described, for access of the respective dock (72, 138) to at least one of the exterior of the respective tier (3, 3', 3") or the system 2. The unit comprises second door 44, allowing access into the room 70 of the unit 54 from outside the unit 54. The unit further comprises at least a second door 44 allowing access between the clean loading dock 72 and at least one of a neighboring unit (10, 46) and the exterior.

Figure 3D:
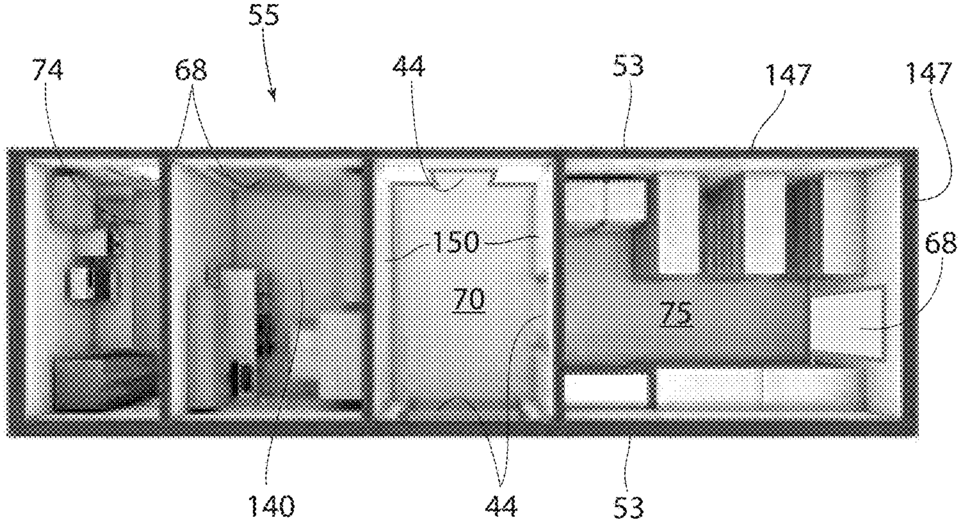
FIG. 3D is a top view of a fourth support unit of the system.

With attention to FIG. 3D, the fourth support unit 55 of the system 2 is described. The unit 55 comprises at least one all-purpose room 75. The room 75 may be used for storage, meetings, sleeping quarters, a computer room, a lab, or any purpose required for the function of the system. The unit 55 comprises at least one separation room 70. Alternatively, the unit 55 has no separation room 70. The unit 55 provides at least one, preferably two, doors 44 into the unit 55, preferably the separation room 70. Preferably the two access doors 44 are along the support unit long axis sides 53 of the unit 55. The unit further provides a door 44 from the separation room 70 into the all-purpose room 75. The unit 55 further provides for at least one food preparation room 74 for preparation of food and nutrition for patients. The unit 55 further provides for at least one medication storage 140 for preparation of food and nutrition for patients. The rooms (74, 140) have individual access doors 68 for accessing the rooms (74, 140).

Figure 3E:
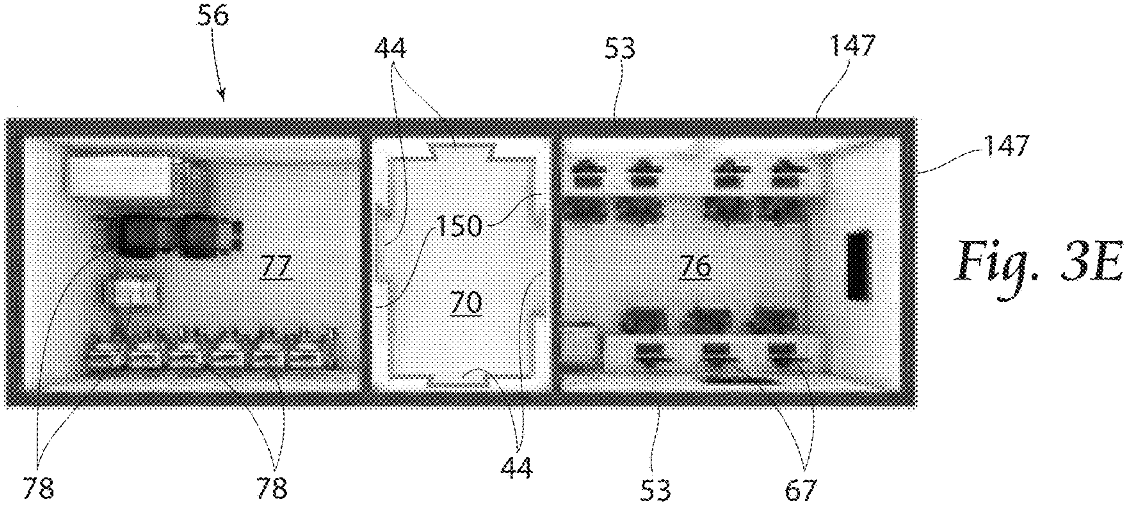
FIG. 3E is a top view of a fifth support unit of the system.

With attention to FIG. 3E, the fifth support unit 56 of the system 2 is described. The unit 56 comprises at least one computer room 76. The computer room may house amenities 67, as previously described, and include computers for use by the staff and providers within the system 2. Alternatively, the unit 56 does not comprise the computer room 76. The unit 56 further comprises at least one therapy equipment storage room 77. The therapy equipment storage room 77 may comprise at least one item of therapy equipment 78 for use by staff and operators within the system 2. Alternatively, the unit 56 does not comprise the therapy equipment storage room 77. The unit 56 may comprise at least one separation room 70. The unit 56 provides at least one, preferably two, doors 44 into the unit 56, preferably the separation room 70. Preferably, the two access doors 44 are along the support unit long axis sides 53 of the unit 55. Alternatively, the doors 44 into the unit 55 may be along any wall of the unit 55. As illustrated in FIG. 3E, the unit 56 provides for access doors 44 from the separation room 70 into at least one of computer room 76 and the therapy equipment storage room 77.

It is understood that any room (65, 71, 73, 72, 74, 75, 76, 77, 70, 138, 140) in any of the support units (51, 52, 54, 55, 56) may provide for any component, and be used for any of the functions, of any room (65, 71, 73, 72, 74, 75, 76, 77, 70, 138, 140) in any of the support units (51, 52, 54, 55, 56) as previously described.

It is understood that any door (44, 68, 69) may comprise any components of any door (44, 66, 69).

It is understood that any room (65, 71, 73, 72, 74, 75, 76, 77, 70, 138, 140) of any support unit (51, 52, 54, 55, 56) may comprise at least one any combination of any door (44, 68, 69) and open access way along any internal wall 150 defining the respective room (65, 71, 73, 72, 74, 75, 76, 77, 70, 138, 140) and any boundary wall 147 defining the respective room (65, 71, 73, 72, 74, 75, 76, 77, 70, 138, 140) of any support unit (51, 52, 54, 55, 56).

Figure 4A:
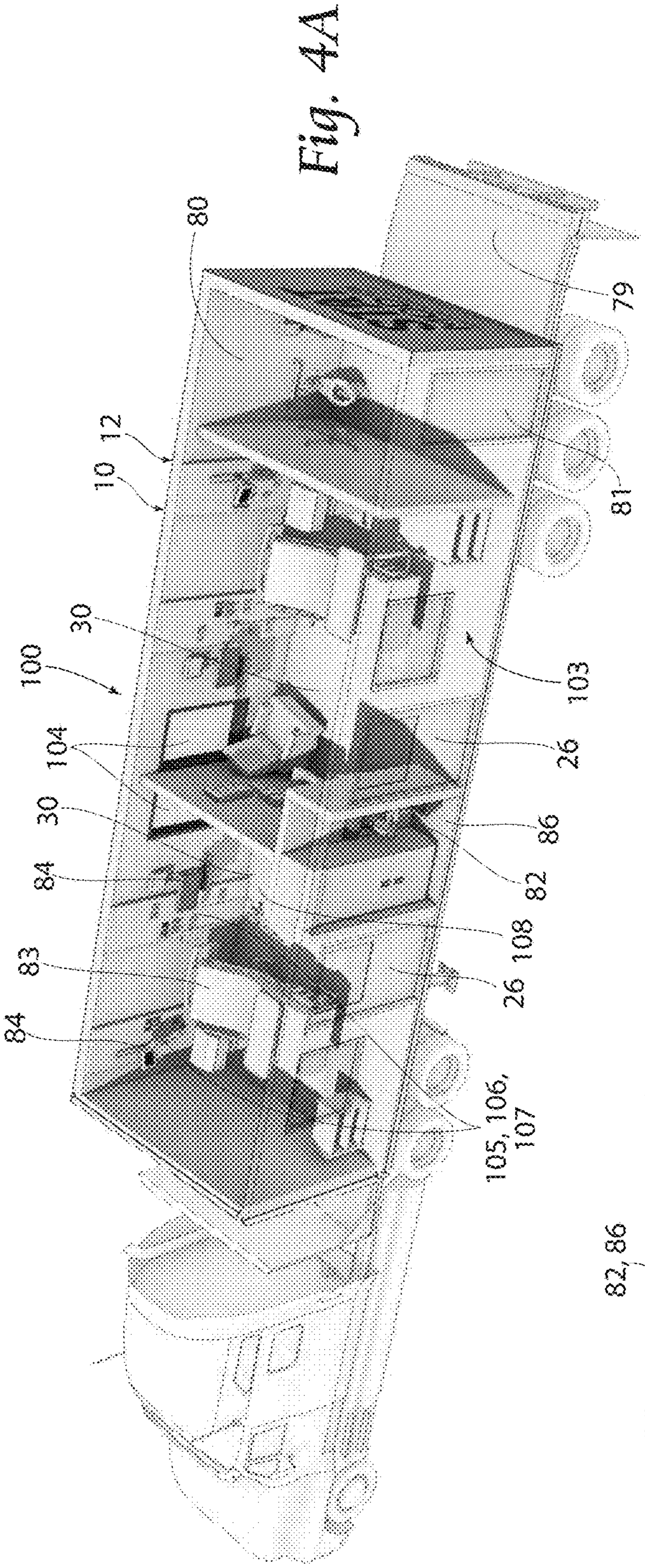
FIG. 4A is a perspective view of a unit of the system, illustrating transporting the unit on a tractor-trailer flatbed.

With attention to FIG. 4A, a first variation of the patient care unit 100 of the system 2 is illustrated. The patient care unit (12, 100, 100') of the system 2 may be transported on a tractor-trailer flatbed 79 to a request location. Where required, the unit 12 may be employed on the tractor-trailer flatbed 79. Further, all units 10 of the system 2, including support units 46, may be at least one of transported and employed on tractor-trailer flatbeds 79. Alternatively, the units 10 of the system 2 may be transported using at least one of airplanes, ships, helicopters, and the tractor-trailer flatbed 79. An intended benefit of the invention provides for a modular unit system 2 comprising units 10 which are transportable upon a tractor-trailer flatbed 79.

Figure 4C:
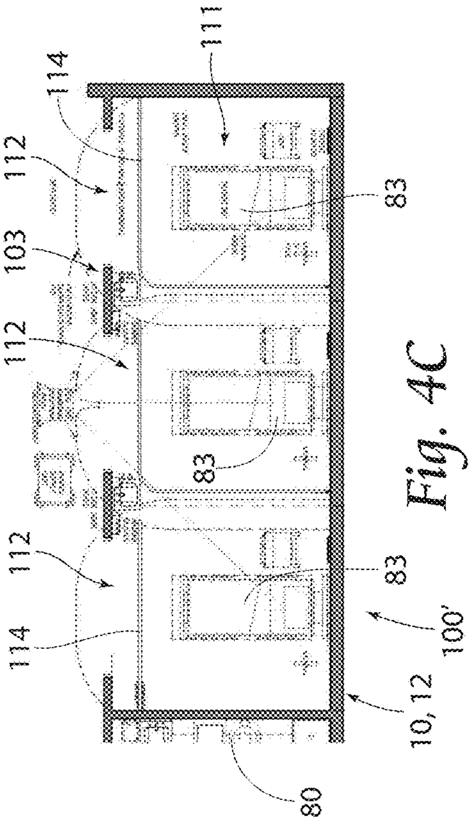
FIG. 4C is a top view of a second variation of the unit of the system.
Figure 4B:
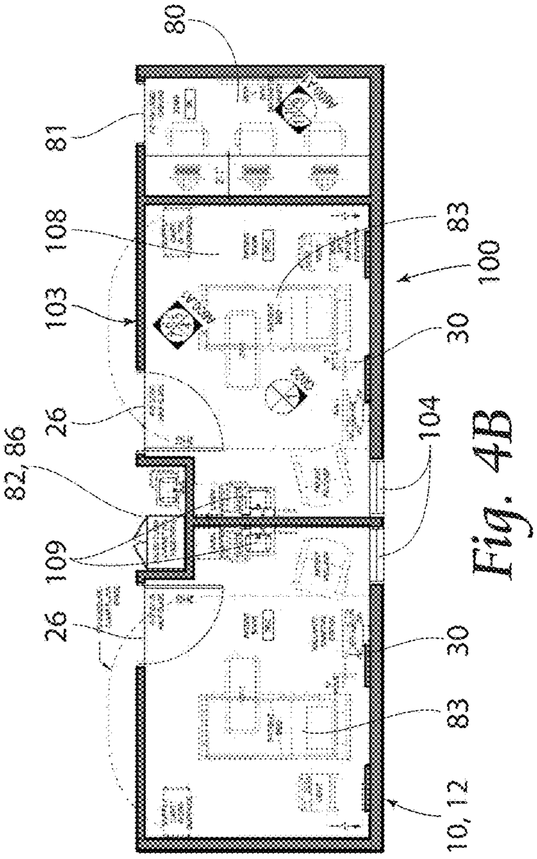
FIG. 4B is a top view of unit of FIG. 4A a computer room.

As illustrated in FIGS. 4A and 4B, a first variation patient care unit 100 may comprise at least one, preferably two, patient rooms 30. At least one patient room 30 of the unit 12 provides for at least one patient resting surface, or bed, 83. As illustrated in FIG. 4A, at least one patient room 30 may provide for an exterior window 104. The exterior window 104 provides a calming feature for workers and patients, and to provide patients the ability to communicate with family members and friends. At least one patient room 30 of the unit (12, 100) provides for at least one item of patient care machinery 84. The patient rooms 30 may provide for access 105 to gas mixtures for ventilators. Such access 105 may be on the at least on wall of the room 30. The rooms 30 may provide vital sign connections 106. Such vital sign connections 106 may be for at least one of cardiac monitoring, and other vital aspect monitoring. The connections may be located along at least one wall of the room 30. The rooms 30 may provide for respiratory treatment ports 107 along at least one wall of the room 30. As illustrated in FIGS. 4A and 4B, the rooms 30 have sufficient floor space 108 for medical equipment, for example x-ray machines, and the patient beds to be maneuvered and for patient transfers. The floor space 108 additionally allows for access and maneuverability of supply carts within the room 30. As illustrated in FIG. 4B, the room 30 may provide for at least one doffing zone 109. The doffing zone 103 may provide an area for disposal of personal protective equipment after care of the patient within the room 30, and handwashing before leaving the room 30. Further, as illustrated in FIG. 7, at least one unit (10, 12, 100) is negatively pressurized, 96, promoting retention of contagions within the specific patient room 30.

As illustrated in FIGS. 4A and 4B, along at least one long axis side 14 of the unit (12, 100) preferably the service side 103, a service alcove 82 may be provided. Such alcove 82 provides additional serviceable floor space 86 outside the patient rooms 30. The alcove 82 may provide for a donning station 116 for preparation to enter a room 30, including hand washing and donning personal protective equipment. Additionally, along the service side 103 of the unit (12, 100), a viewing window 110 may be provided for at least one room 30 of the unit (12, 100). The viewing window 110 allows for monitoring of the patient without placing the healthcare workers at continued risk. An intended benefit of this invention provides for immediate access to personal protection features at the patient care unit.

As illustrated in FIGS. 4A and 4B, the unit (12, 100) may comprise at least one service room 80 having a service room access door 81 along at least one long axis side 14, preferably the service side 103. As illustrated in FIGS. 1A-1C and FIGS. 4A and 4B, the service room 80—may be at least one of a bathroom, a computer room, and a therapy service room for maintenance of patient rooms 30 and/or beds 83.

With attention to FIG. 4C, the second variation of the patient care unit 100' of the system 2 is described. It is understood the second variation of the patient care unit 100' may comprise at least one feature of the first variation of the patient care unit 100. It is understood the first variation of the patient care unit 100 may comprise at least one feature of the second variation of the patient care unit 100'. The second variation of the patient acre unit 100' is a patient ward 111. The patient ward 11 comprises at least one, preferably three, beds 83. As stated earlier, the second variation of the patient unit 100' preferably does not provide for access doors to the beds 83. Preferably, the second variation of the patient unit 100' provides for open walkways 112 into the ward 111. At least one bed 83 may be provided with a retractable screen unit 114 to provide privacy to the patient occupying the respective bed 83.

It is understood that each unit (10, 12) may be a stand-alone unit (10, 12) with all the required features for patient therapy.

Figure 5:
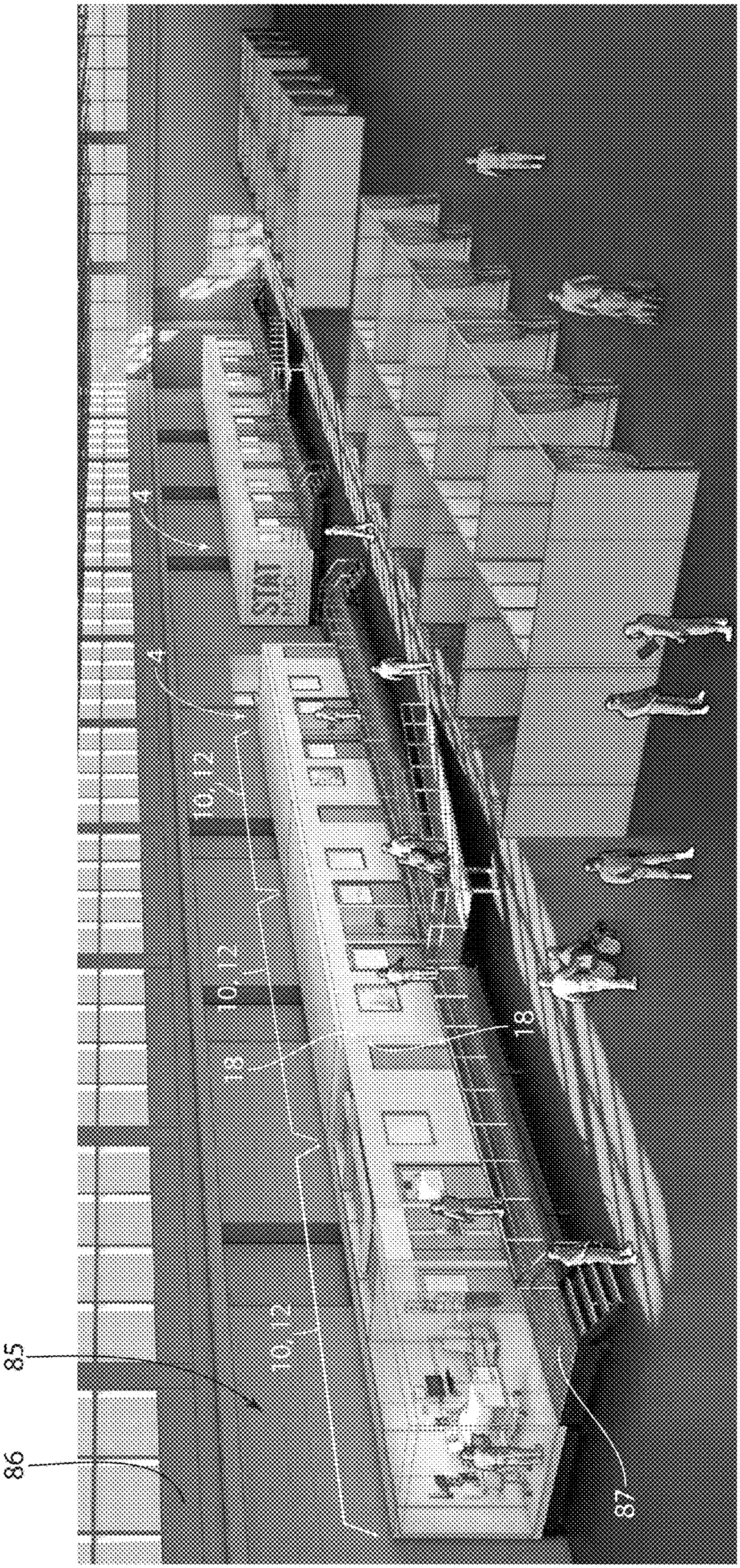
FIG. 5 is a perspective view of a first orientation of the system positioned within a large covered facility.

With attention to FIG. 5, a first orientation of the system 2 positioned within a large covered facility or building 86. The system 2 may be positioned within an internal space 85 of a building 86. The units (10, 12) may be positioned end 18 to end 18. The system 2 can be arranged to not provide for a corridor 40. Instead, patient care sections 4 may be accessed using access ways 87. Further, patient care sections 4 may be positioned in any manner with respect to on another. Additionally, support sections 6 may be positioned away from the patient care sections 4, or not employed. An intended benefit of this invention provides for separate patient care units 10 to be attached end 18 to end 18.

Figure 6A:
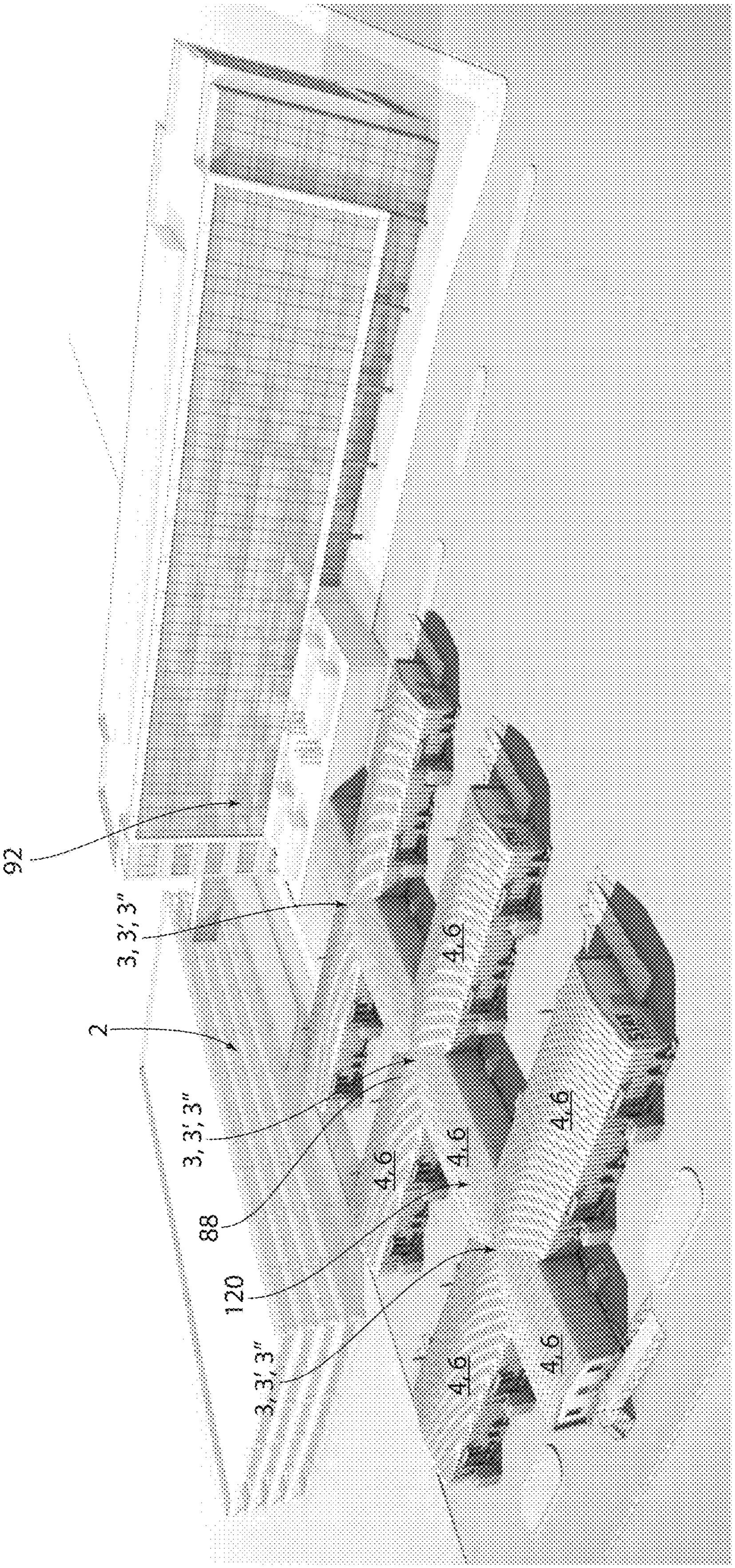
FIG. 6A is a perspective view of a second orientation of the system positioned in the open environment, illustrating three tiers.

With attention to FIG. 6A, a second orientation of the system 2 is illustrated as positioned in the open environment, illustrating three tiers (3, 3', 3"). A roof 88 may be placed over the system 2, or part of the system 2. As illustrated in FIG. 6A, a system orientation may provide for multiple tiers (3, 3', 3"), for example three tiers (3, 3', 3"), positioned in alignment. Further, as illustrated in FIG. 6, the system may be attached to another facility 92, for example a hospital infrastructure.

Figure 6B:
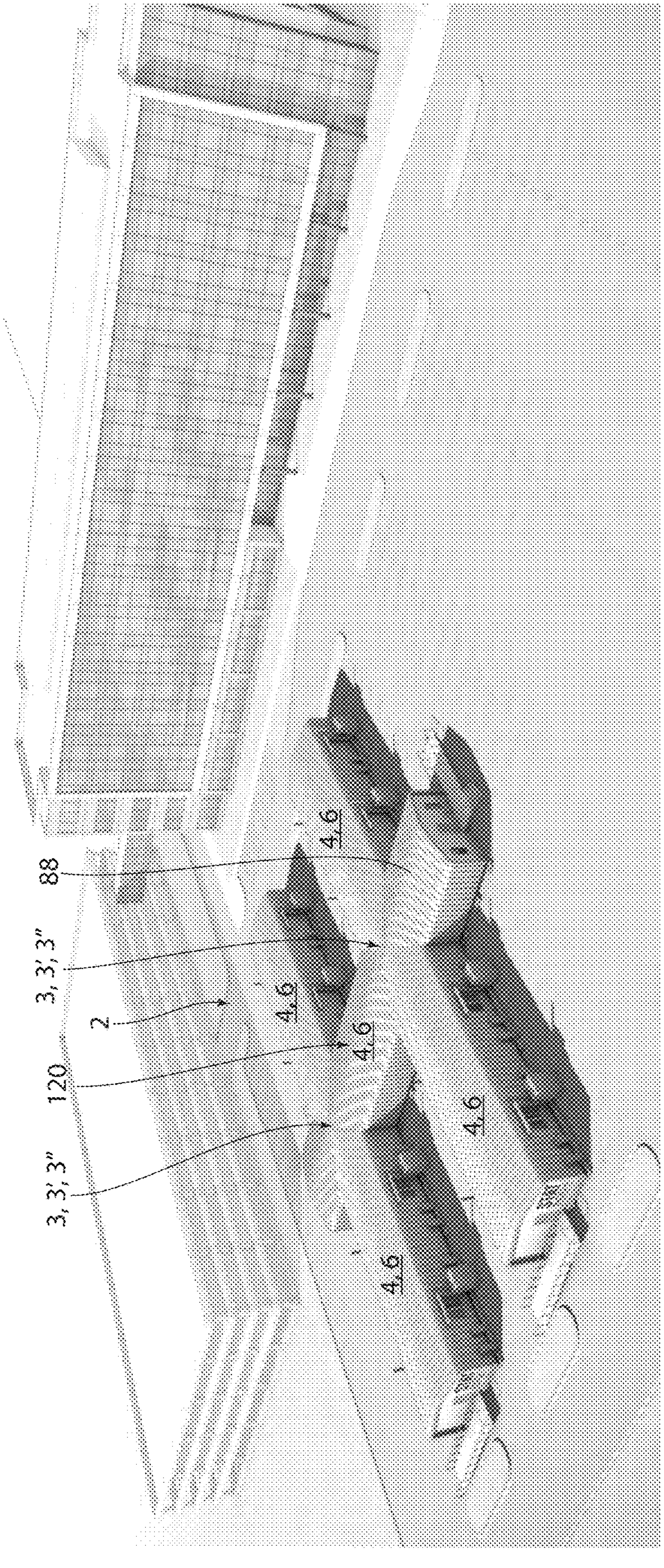
FIG. 6D is a perspective view of a third orientation of the system positioned in the open environment, illustrating two tiers.
FIG. 6C is a perspective view of a fourth orientation of the system positioned in the open environment, illustrating four tiers.
Figure 6C:
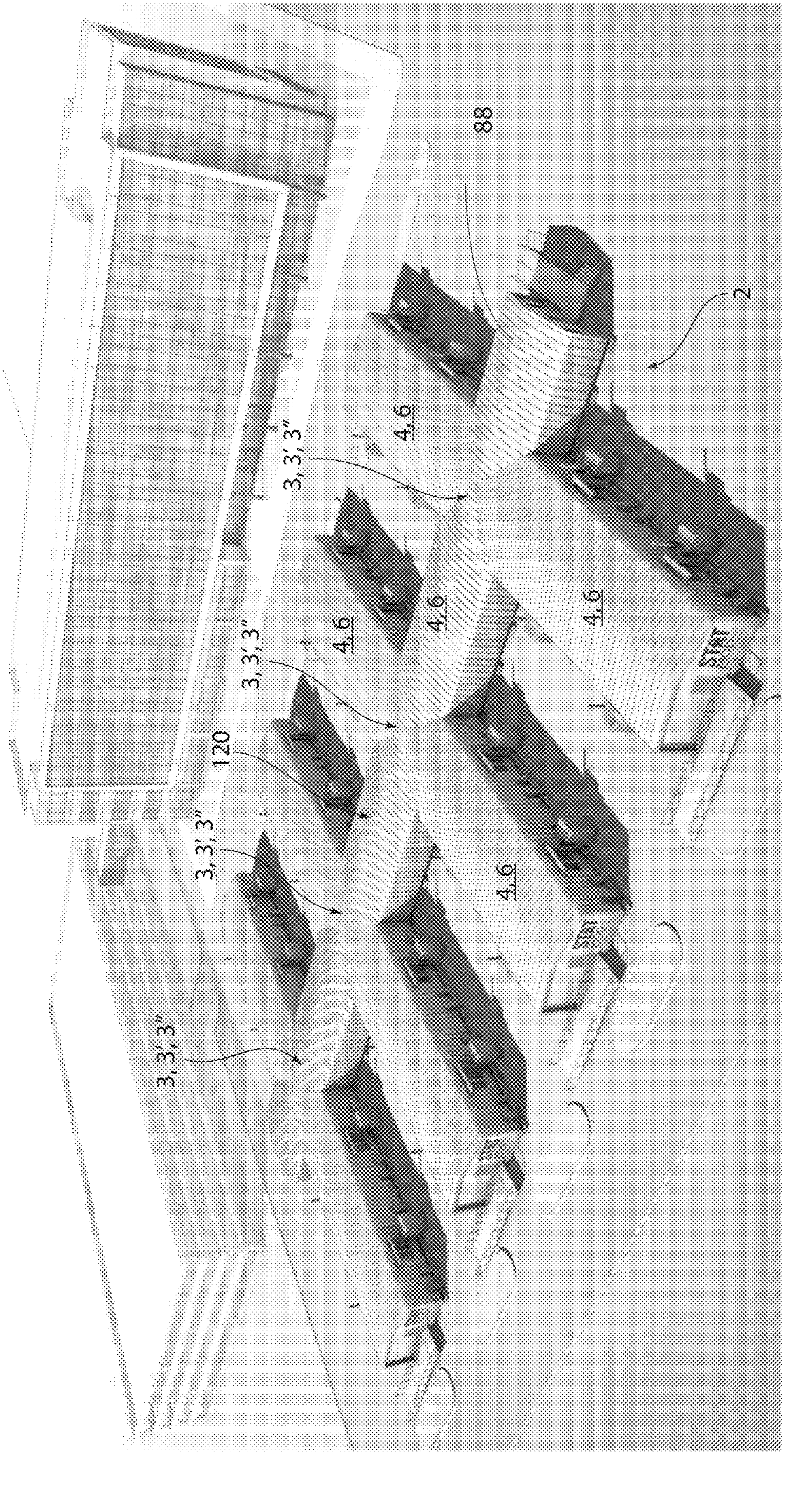

With attention to FIGS. 6B and 6C, alternatively, the system 2 may be stand alone. The orientations in FIGS. 6B and 6C illustrate the system 2 may be a self-sufficient standalone system with infrastructure to support the system 2. As illustrated in FIG. 6B, a third orientation of the system is positioned in the open environment with two tiers (3, 3', 3"). As illustrated in FIG. 6C, a fourth orientation of the system positioned in the open environment with four tiers (3, 3', 3").

It is understood the system 2 may be positioned in both indoor environment, as illustrated in FIG. 5, outdoor environments, as illustrated in FIGS. 6A-6C, and a combination of indoor and outdoor environments. It is understood the system 2 may have more than four tiers (3, 3', 3"). Further, it is understood the orientation of the system 2 is not limited by attachment mechanisms mating individual units 10 together or sections (4, 6) with one another. The individual units (10) may be attached or in close proximity to one another. The respective sections (4, 6) may be attached or in close proximity to one another. With that, it is understood the features of the system 2 may be placed in any number of orientations. Any orientation of the system 2, whether illustrated or not, may comprise a feature of another orientation of the system 2. Thus, the orientation of the system 2 is not limited of units 10 and sections (4, 6), and may be according to the demands, space, and logistics at hand. An intended benefit of this invention provides for combining the units 10 and tiers (3, 3', 3") in a manner not limited by the mechanism for combining the units 10 and tiers (3, 3', 3").

Figure 7A:
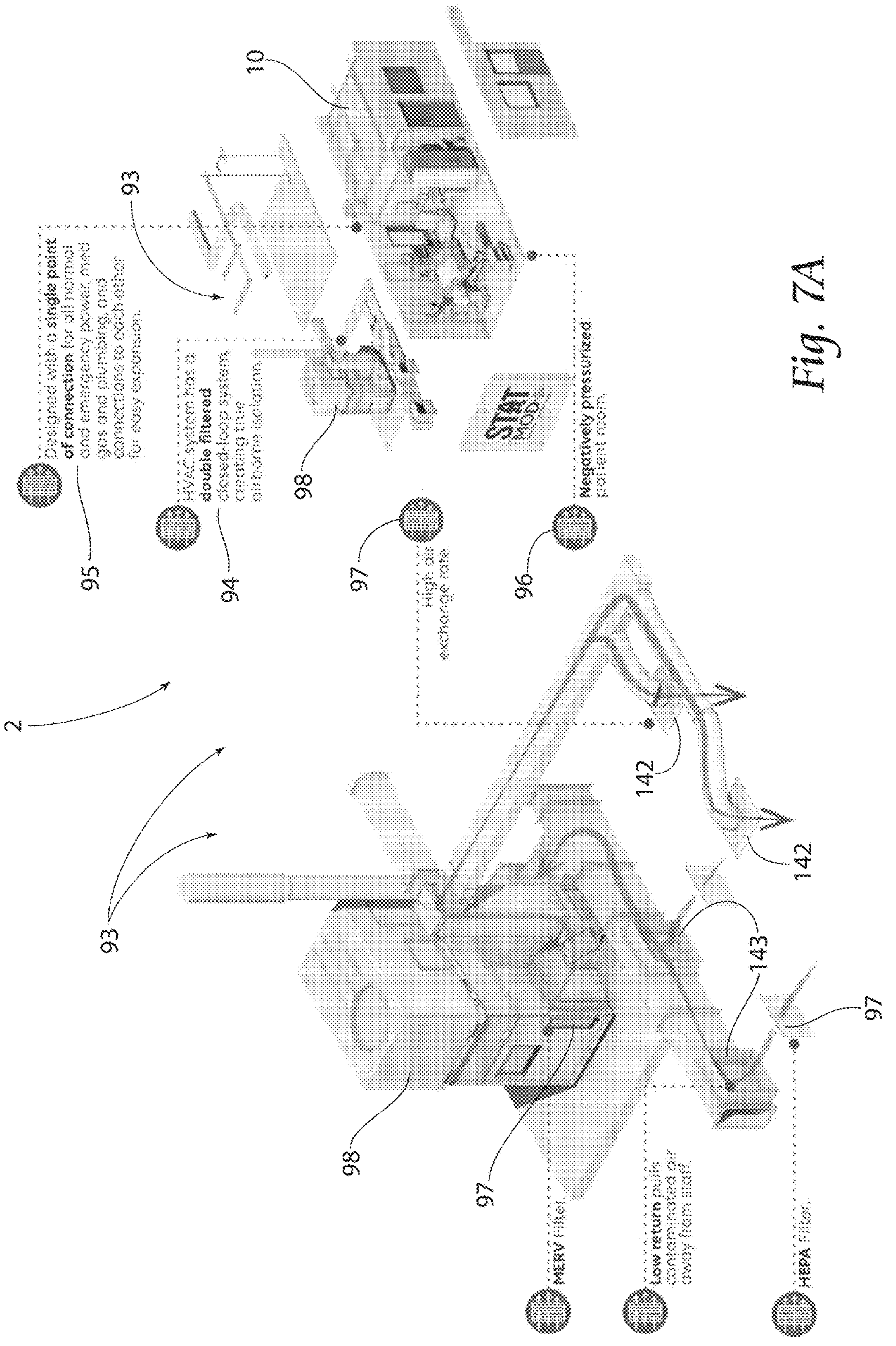
FIG. 7A is a perspective view of the heating, ventilation and air condition plant of the system.

With attention to FIG. 7A, a heating, ventilation and air condition (HVAC) system 93 of the modular configurable multi-purpose system 2 is described. The HVAC system 93 is a constant flow system, allowing for continuous operation upon installation. The HVAC system 93 may be a double closed loop filter system 94. Alternatively, the HVAC system 93 may be any system known in the industry. The HVAC system 93 has at least one point of contact with the at least one unit 10, 95. At least one unit 10 is negatively pressurized, 96. Alternatively, no units are negatively pressurized. The HVAC system 93 provides for a rate of air exchange. Preferably, the HVAC system 93 provides for a high rate of air exchange. The HVAC system 93 provides for at least one filter 97. Preferably, the HVAC system 93 provides for at least one filter 97, for example a HEPA filter, located at one or multiple units 10. Additionally, the HVAC system 93 provides for at least one filter 97, for example a MERV filter, at a central unit 98 of the system 93. The HVAC system 93 thus provides for efficient exchange of air within at least one unit 10. Additionally, the filters 97 reduce cross contamination between units 10.

Figure 7B:
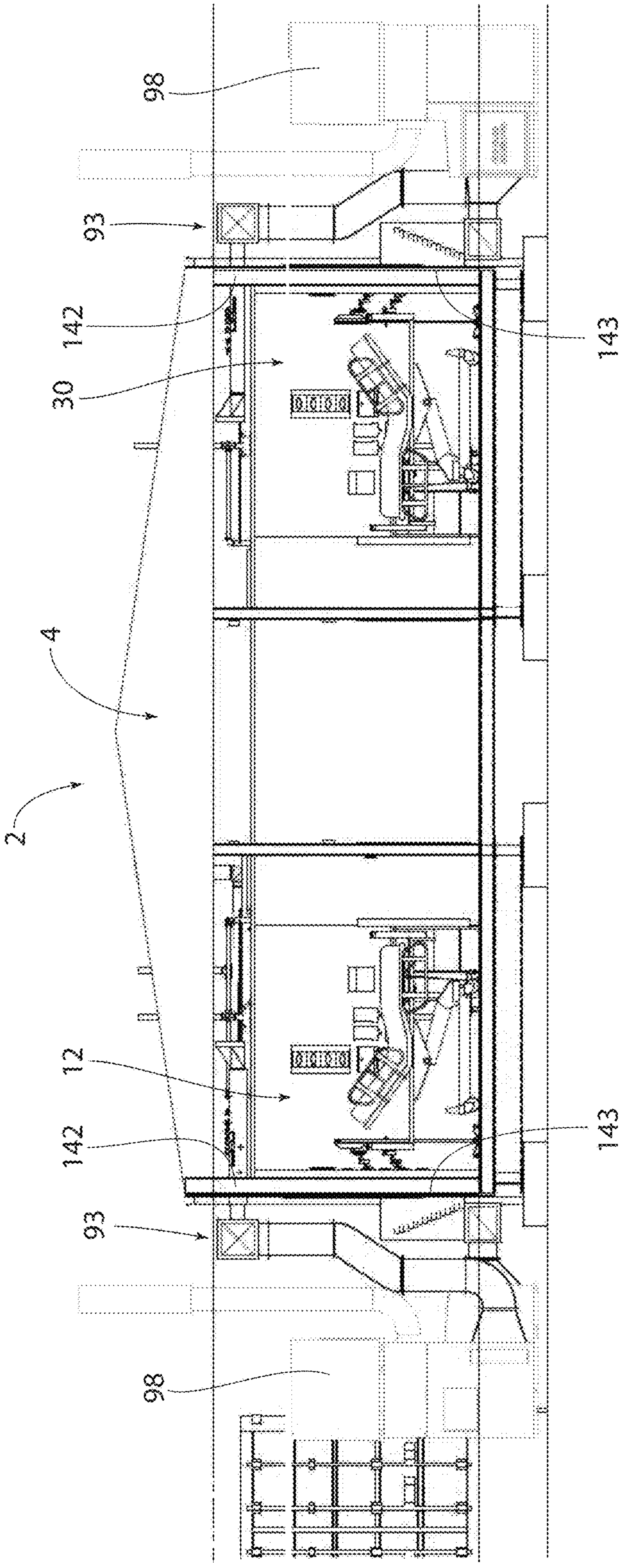
FIG. 7B is a cross-section of the unit of the system, illustrating connection of the heating, ventilation and air condition plant of the system with a patient care section of the system.

As illustrated in FIGS. 7A and 7B, at least one HVAC system 93, and the associated central unit 98, is connected to a patient care section 4 at one or more air input locations 142 and a corresponding air return 143. The air return 143 preferably being a low air return. As illustrated in FIG. 7B, the combination of the air input location 142 and the corresponding low air return provides for negative pressurization of at least one of a patient 30 and a patient care unit 12.

Figure 8A:
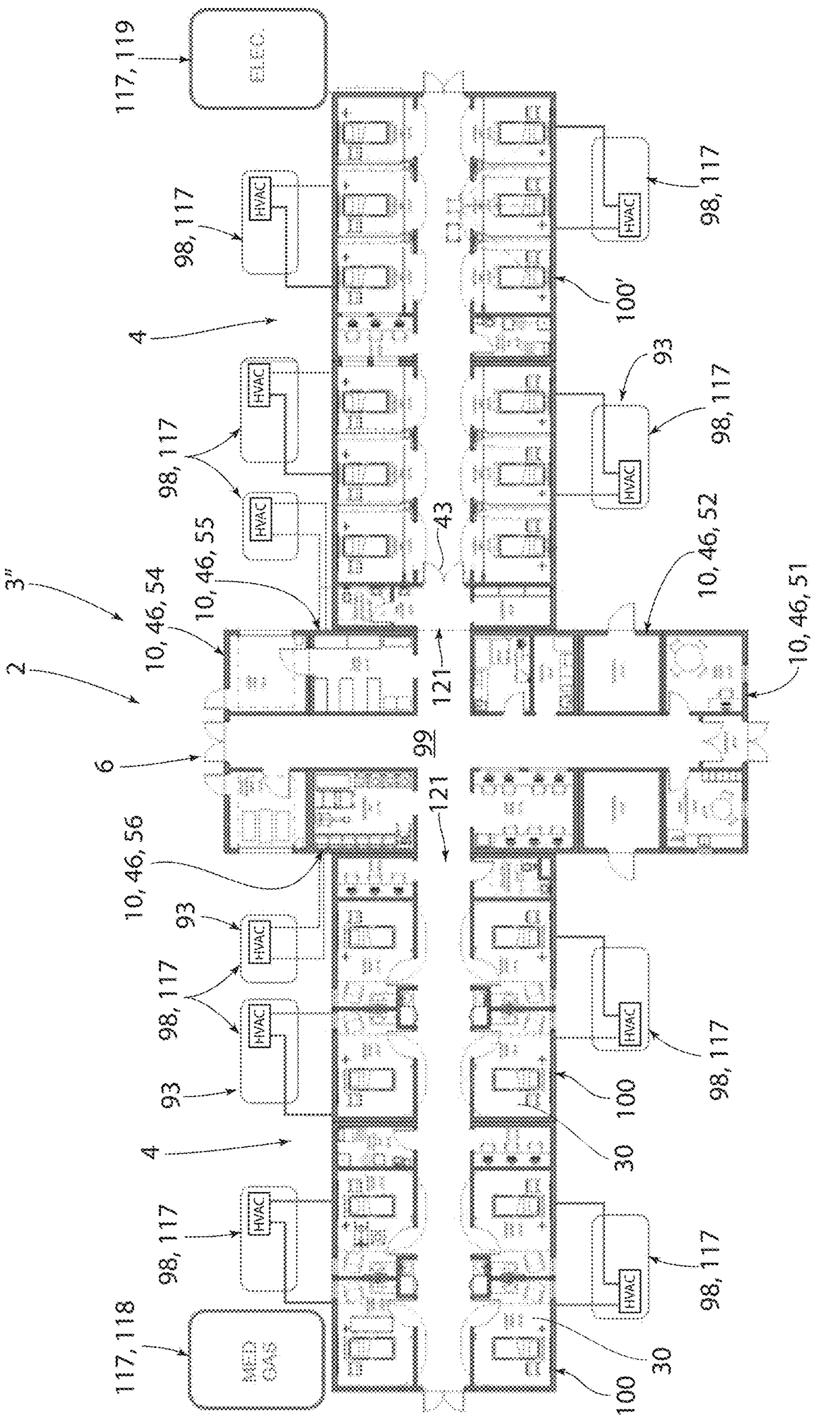
FIG. 8A is a top view of another tier of the system, illustrating locations of support systems.
Figure 8B:
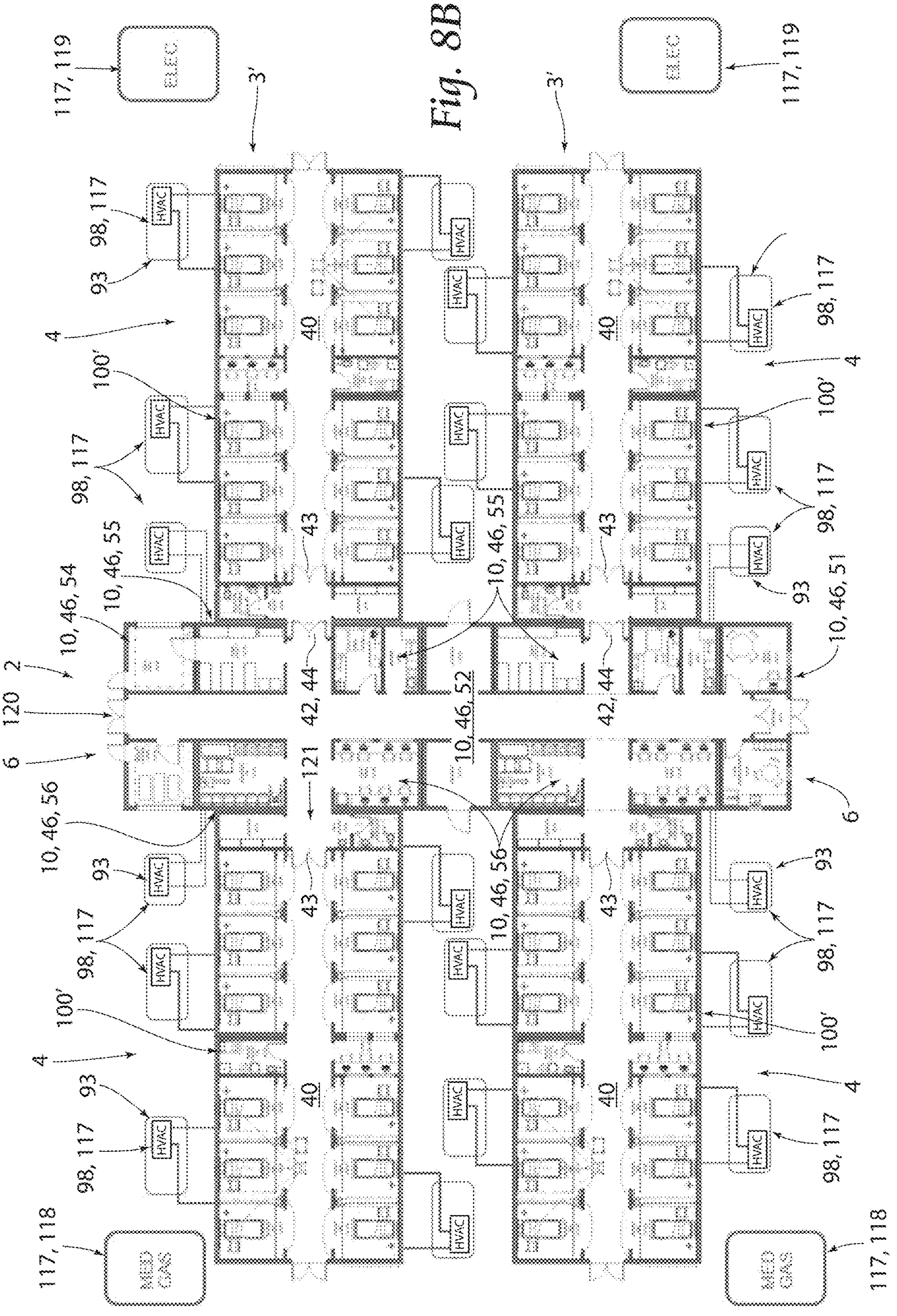
FIG. 8B is a top view of two tiers of the system in communication with one another, illustrating locations of support systems.

With attention to FIGS. 8A and 8B, locations of support systems 117 for the modular configurable multi-purpose system 2 are described. Support systems 2 comprise, but are not limited to, HVAC systems 93, medical gas 118, and electrical systems 119. Additionally, it is understood each tier (3, 3', 3") may include at least one of power generators, supply water, and a holding tank for sanitary purposes. FIG. 8A illustrates the third variation of the tier 3" of the system 2. Both the medical gas storage (117, 118) and electrical systems (117, 119) are positioned in close proximity to the tier 3" of the system 2 that the medical gas storage (117, 118) and the electrical system (117, 119) supports. Each patient care unit (12, 100, 100') is connected to the HVAC system 93 and a central unit 98 of the respective HVAC system 93. Thus, each patient care unit (12, 100, 100') is supported by an HVAC system 93, providing circulated air and potentially a negative pressure environment within the unit (12, 100, 100'), or individual rooms of the unit (12, 100, 100').

FIG. 8B illustrates two second variations of the tier 100' of the system 2 in communication with one another at the support sections 6, forming a combined support unit 120, and in the third orientation of the system. The support sections of each tier 3' comprise the at least one of the fourth support unit (10, 46, 55) and the fifth support unit (10, 46, 56) in communication with each of the patient sections 4 of the tier 3'. The first support unit (10, 46, 51) and the third support unit (10, 46, 54) are positioned at opposite ends of the combined support section 120. The second support unit is positioned approximately half way between the first support unit (10, 46, 51) and the third support unit (10, 46, 54) along the combined support section 120. As illustrated in FIG. 8A, in FIG. 8B each patient care unit (12, 100') is connected to a central unit 98 and the HVAC system 93 of the respective central unit 98. Thus, each patient care unit (12, 100') is supported by an HVAC system 93, providing circulated air and potentially a negative pressure environment within the unit (12, 100)'.

Figure 10:
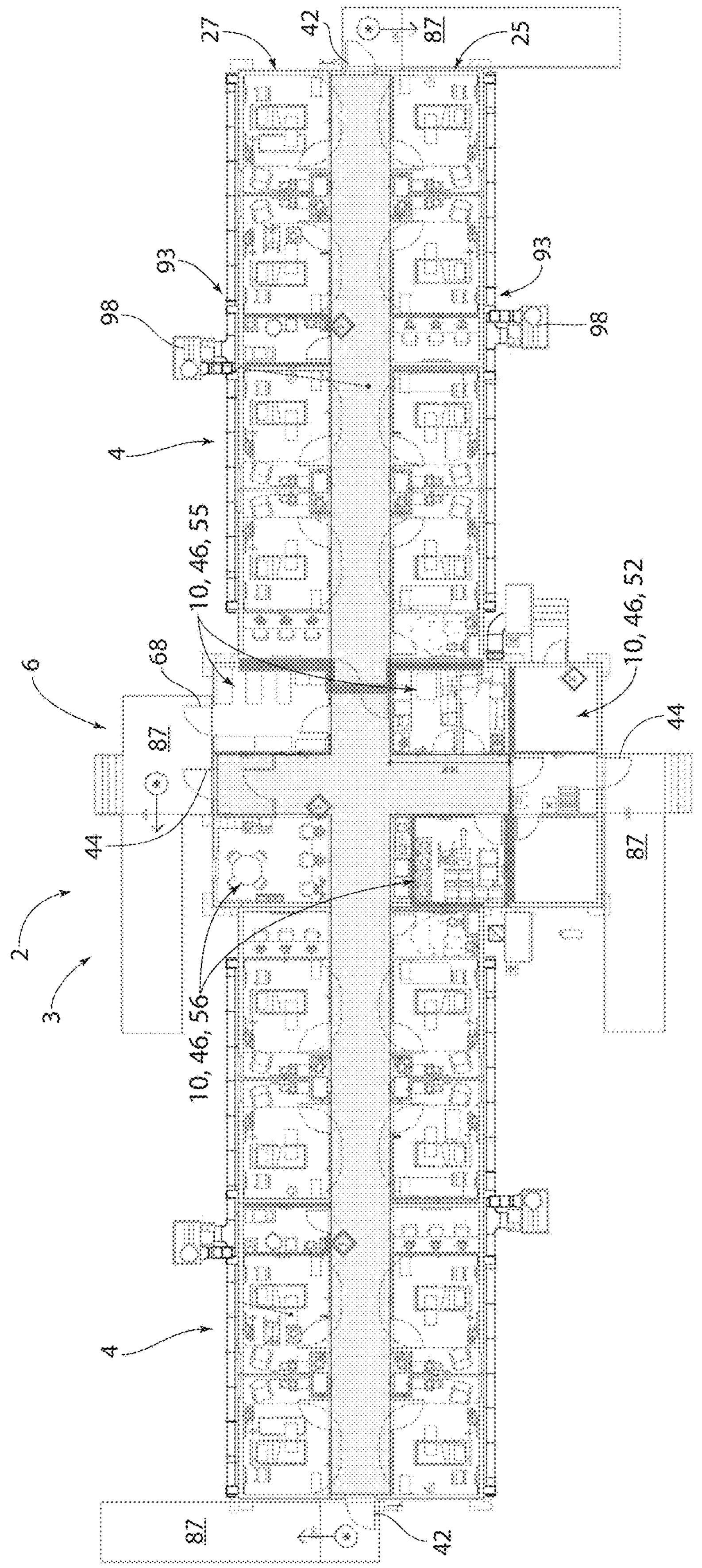
FIG. 10 is a top view of a fifth orientation of the system.

Alternatively, more than one patient care unit (12, 100, 100') make be supported by one HVAC system 93 and the corresponding central unit 98. Alternatively, as illustrated in FIG. 10, each patient car subsection (25, 27) of a respective patient care unit 4 is supported by one HVAC system 93, and the associated central unit 98, as previously described. As illustrated in FIG. 8B, the support section 6 of each tier 3' is connected to two HVAC systems 93.

As illustrated in FIGS. 8A and 8B, at least one patient care section entry way 121 from the support section 6 of a tier (3, 3', 3") to a patient section 4 of the tier (3, 3', 3") may not comprises an access door (42, 44). Alternatively, the at least one patient care section entry way 121 from the support section 6 of a tier (3, 3', 3") to a patient section 4 of the tier (3, 3', 3") may comprise an access door (42, 44). Alternatively, in close proximity to a respective entryway 121 between a support section 6 and a patient care section 4, within the corridor space 40 of the respective patient care section 4, a recessed corridor door 43 may be positioned, without an access door (42, 44) positioned at the entryway 121. Alternatively, in close proximity to a respective entryway 121 between a support section 6 and a patient care section 4, within the corridor space 40 of the respective patient care section 4, a recessed corridor door 43 may be positioned, and an access door (42, 44) is additionally positioned at the respective entryway 121. It is understood at least one recessed corridor access door 43 may comprise at least one feature of the access door 42, and at least one access door 42 may comprise one feature of the corridor access door 43. It is understood at least one corridor access door 43 may comprise at least one feature of the door 44, and at least one door 44 may comprise one feature of the corridor access door 43.

Figure 9A:
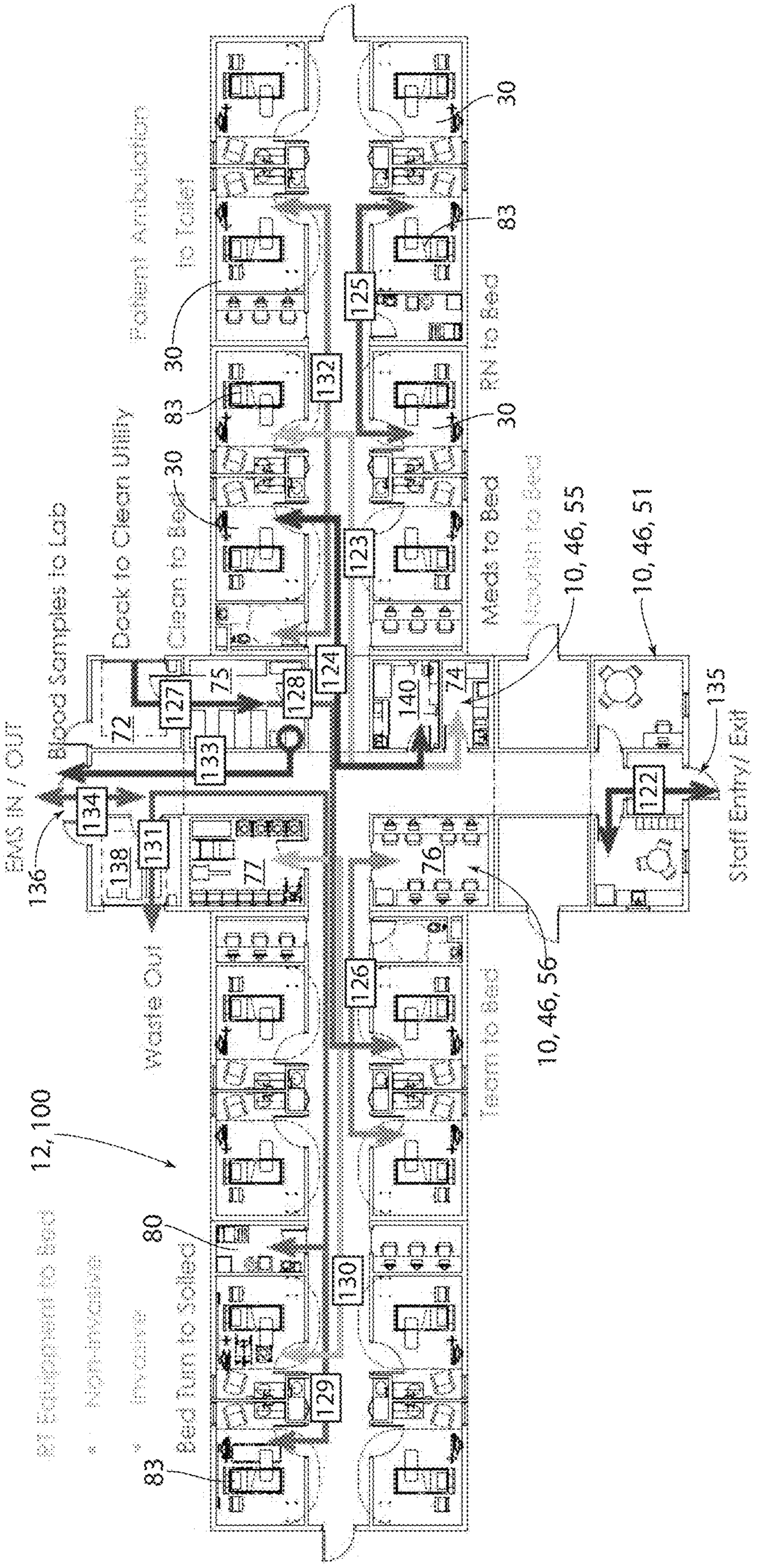
FIG. 9A demonstrates the invention in operation as a medical facility.

FIG. 9A is a method of operating the system 2 comprising one tier (3, 3', 3"). Initially standalone units, patient and/or support, are provided and transported to a location for combining the units into a system. The units are attached to one another, as previously described. The attachments of the units create seals that provide for controlled environment of the system, as previously referenced. Staff and healthcare personnel enter into and out of the tier (3, 3', 3"), system 2 at a designated staff/healthcare personnel access location 135, preferably in a support unit (10, 46), 122. As illustrated in FIG. 9A, the access location 135 is at the first support unit (10, 46, 51). Staff and personnel transfer food and/or nutrition from the food preparation room 74 to the specific patient room 30 or bed 83, 123. Staff and personnel transfer medication from medication storage 140 to the specific patient room 30 or bed 83, 124. As illustrated in FIG. 9A, the medication storage 140 and food preparation room 74 are located in the fourth support unit (10, 46, 55) of each tier (3, 3', 3"). Registered nurses monitor patients in separate rooms 30 and or beds 83, 125. Staff and personnel move between the patient room 30 or bed 83 and the computer room 76, 126. As illustrated in FIG. 9A, the computer is located in the fifth support unit (10, 46, 56) of each tier (3, 3', 3"). Materials and equipment entering the system 2 enter into the clean loading dock 72 and are stored in the all-purpose room 75 of each tier (3, 3', 3") or other rooms of the system 2, 127. Equipment and materials are transferred from the all-purpose room 75, or other room of the system, to the specific patient room 30 or bed 83, 128. Where a bed 83 is soiled or the coverings of the bed 83 are dirty in another manner, the coverings are transferred to the service room 80 of the respective patient care unit (12, 100, 100'), 129. Therapy equipment is transferred to a specific patient room 30 or bed 83 from the therapy equipment storage room 77 of the tier (3, 3', 3"), 130. Waste accumulated in the system 2 from at least one of the patient room 30, a specific bed 83, the service room 80 and other rooms of the system 2 is transferred out of the system 2 through the waste removal dock 138, 131. Patients who are ambulatory or mobile may use the bathrooms provided in at least one service room 8 of the respective patient care section 4, 132. Blood samples taken of patients in the system are transferred out of the system 2 from a utility access point 136, 133. Emergency medical service (EMS) access the system through the utility access point 136 to provide emergency services to patients and/or remove patients from the system 2, 134.

Figure 9B:
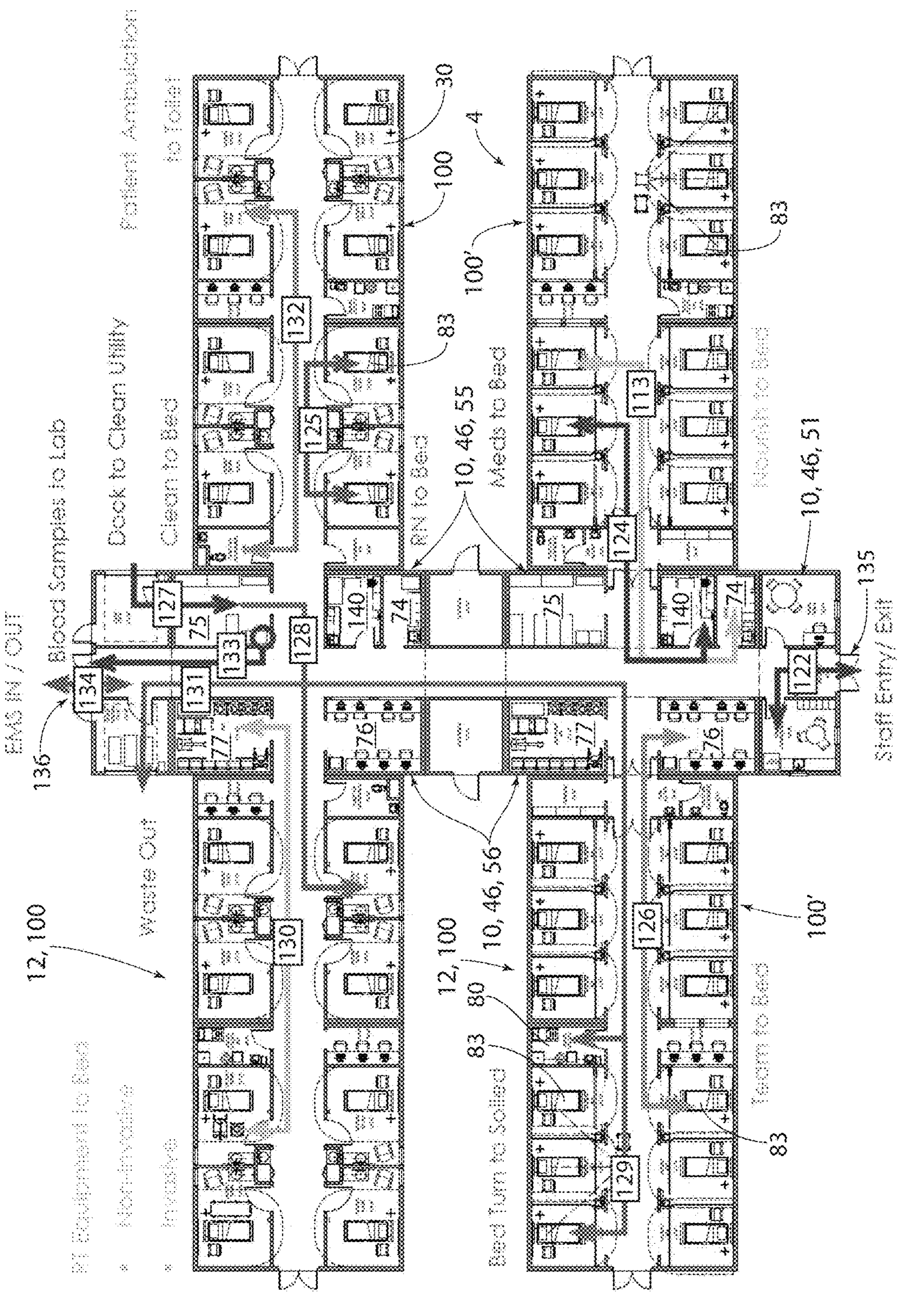
FIG. 9B demonstrates an alternate arrangement of the invention in operation.

FIG. 9B illustrates the method of operating the system 2 applied to the system 2 comprising two tiers (3, 3', 3"), specifically the first variation of the tier 3 and the second variation of the 3'. It is understood the method of operation as described in FIG. 9A, which depicts one tier (3, 3', 3"), applies to systems comprising more than one tier (3, 3', 3"), as illustrated in FIG. 9B. It is understood that operations for a patient in a specific tier (3, 3', 3") sourced at fourth support unit (10, 46, 55) and the fifth support unit (10, 46, 56) will come from the respective fourth support unit (10, 46, 55) and the fifth support unit (10, 46, 56) of that specific tier (3, 3'3 3") where possible but may come from a different tier (3, 3', 3"). It is understood the method operation applies to any tier (3, 3', 3") and any orientation of the system 2.

An intended benefit of this invention provides for a method of operation ensuring efficient and safe operation of the system 2.

With attention to FIG. 10, a fifth orientation of the system 2. As illustrated in FIG. 10, the system 2 may be oriented to comprise the first variation of the tier 3 where two support units 46 are removed. The fifth orientation provides for use of the fourth support unit (10, 46, 55), the fifth support unit (10, 46, 56) and the second support unit (10, 46, 52) as previously described. It is understood, the second support unit (10, 46, 52) may be substituted with one of the first support unit (10, 46, 51) and the third support unit (10, 46, 54). An access way 87 is positioned at one or more, preferably all, doors (42, 44, 68) providing access to the tier 3 and system 2. The access way 87 provides for at least one of stairs and wheelchair access. It is understood the fifth orientation of the system may be applied to any variation of the tiers (3, 3', 3") of the system 2.

Figure 11:
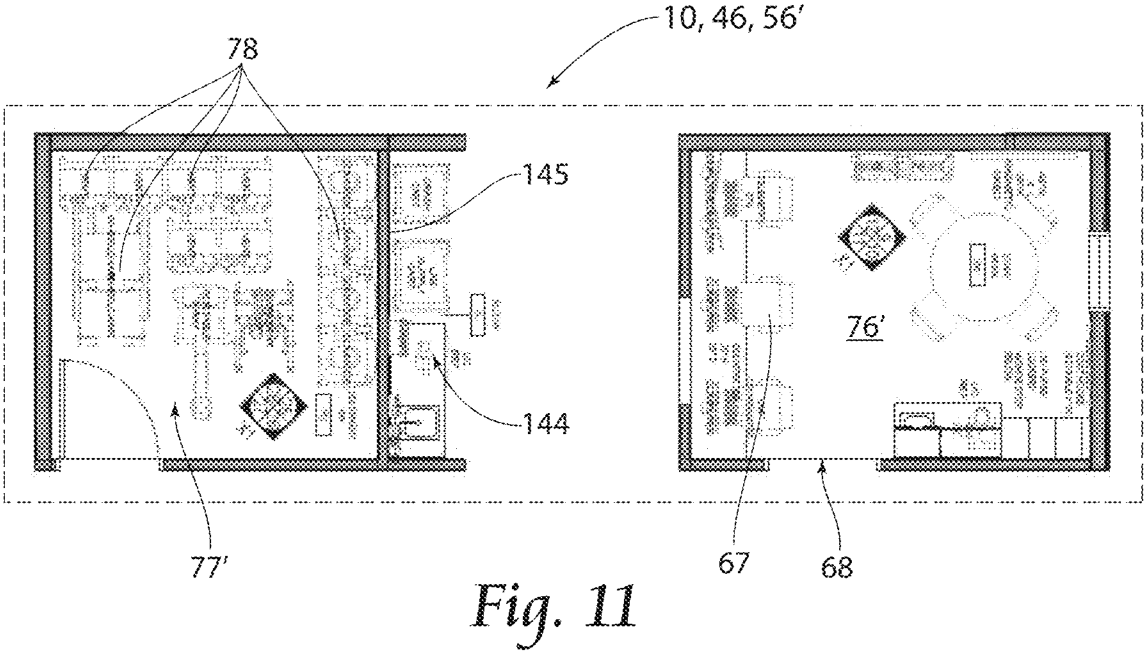
FIG. 11, is a top view of an alternative variation of the fifth support unit.

With attention to FIG. 11, an alternative variation of the fifth support unit (10, 46, 56') is provided. The alternative variation (10, 46, 56') comprises two room modules, the computer room module 76' and the therapy equipment storage room module 77'. The alternative variation (10, 46, 56') may incorporate at least one feature of the fifth variation of the support module (10, 46, 56). The computer room module 76' may incorporate a door 68 for access into the computer room module (10, 46, 56'). The therapy equipment storage room module 77' may incorporate a support work-station 144 along the module 77'. Preferably, the station 144 is located along the exterior of the module 145.

Figure 12:
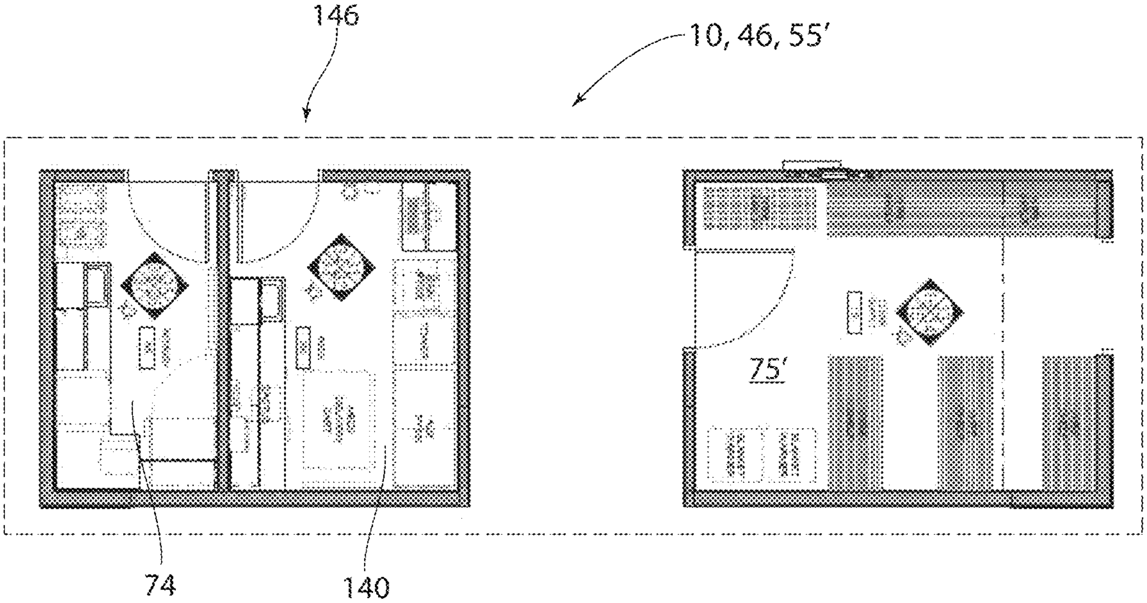
FIG. 12, is a top view of an alternative variation of the fourth support unit.

With attention to FIG. 12, an alternative variation of the fourth support unit (10, 46, 55') is provided. The alternative variation (10, 46, 55') comprises two room modules, the all-purpose room module 75' and the nutrition and medication preparation room module 146. The alternative variation (10, 46, 55') may incorporate at least one feature of the fourth variation of the support module (10, 46, 55). The nutrition and medication preparation room module 146 comprises the preparation room 74 and medication storage 140 as previously described.

Figure 13A:
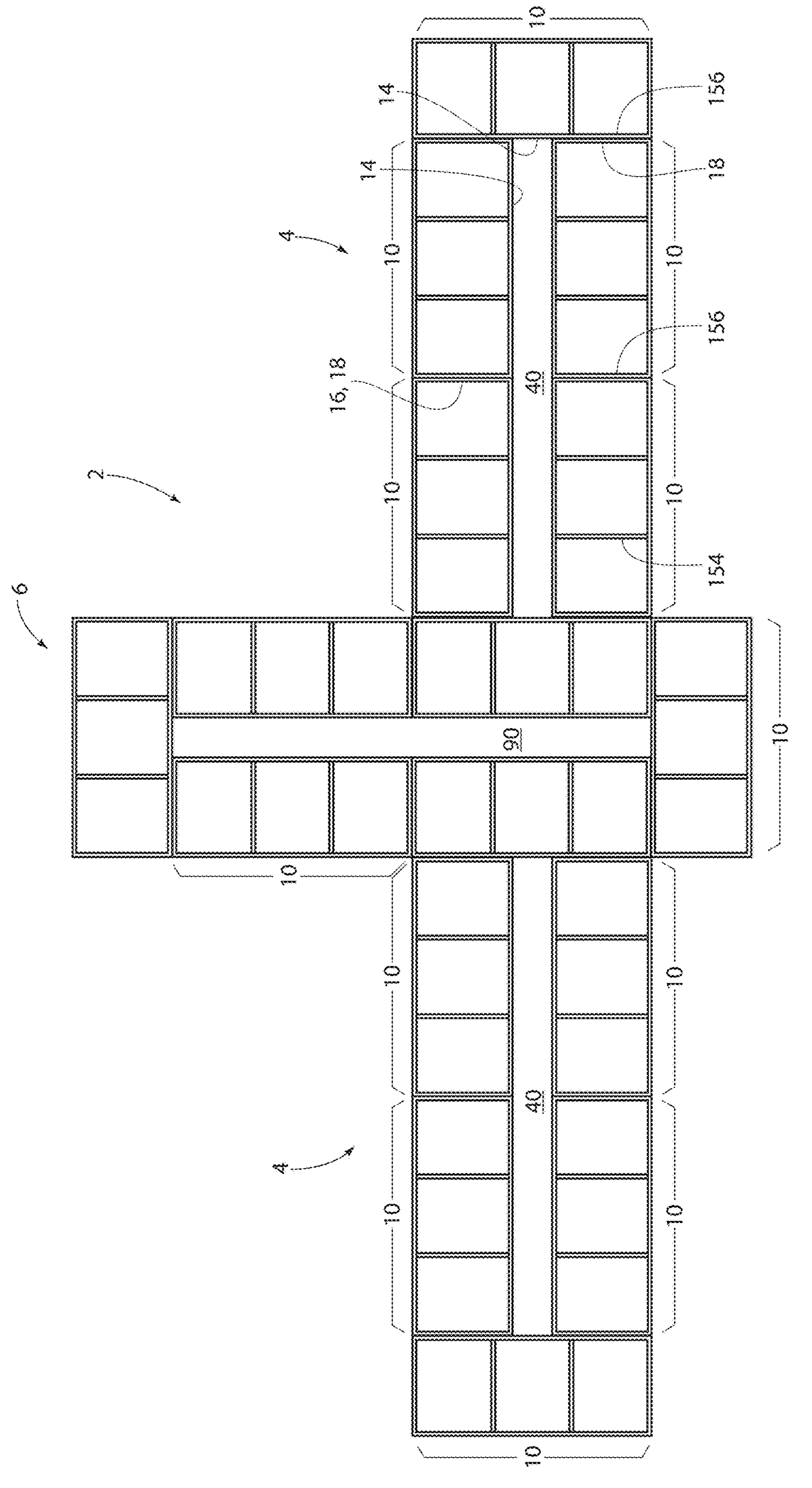
FIG. 13A is a top view of an arrangement of the present invention, illustrating box-framed structured units.
Figure 13B:
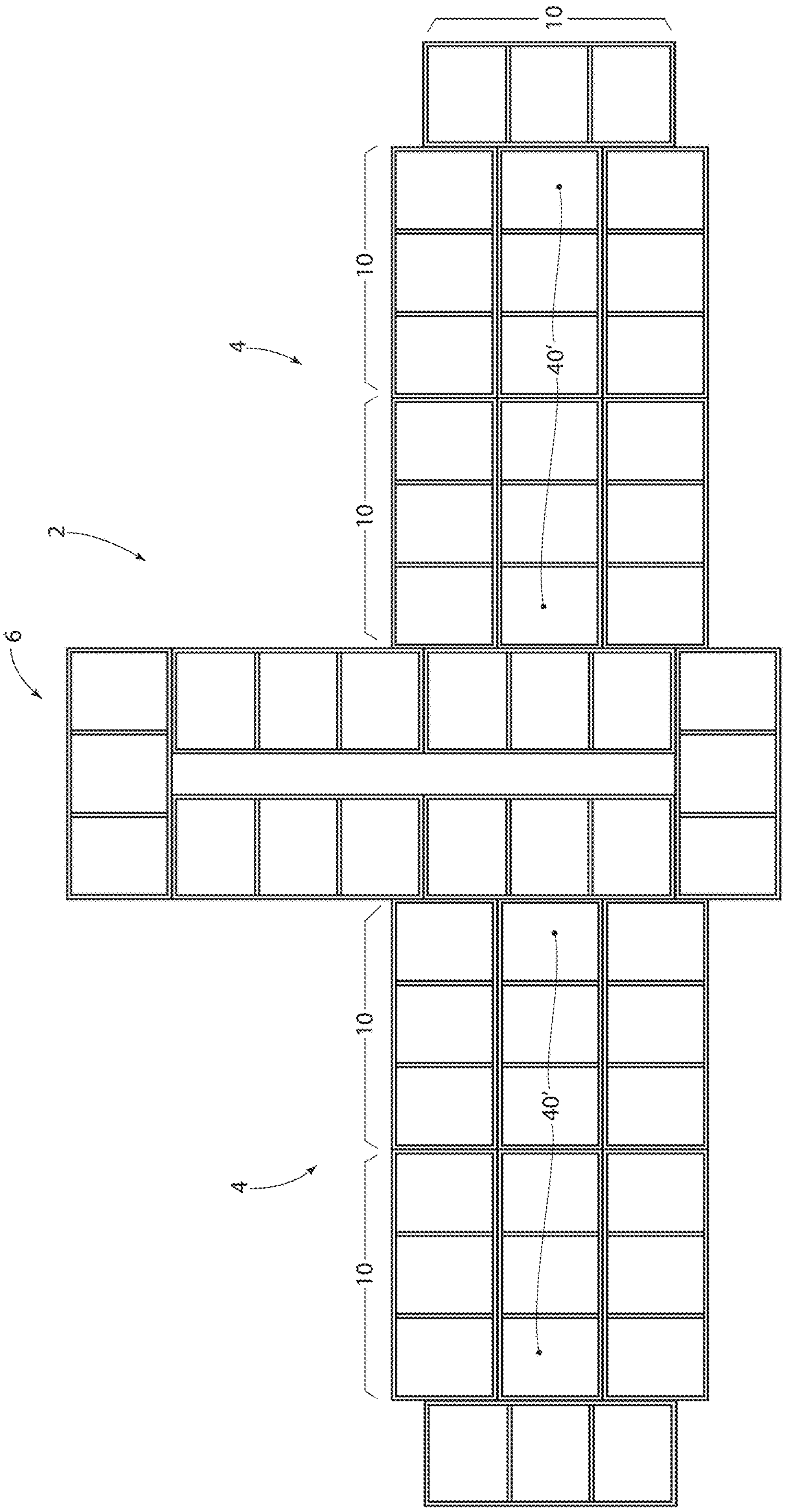
FIG. 13B is a top view similar to FIG. 13A, of a tier of illustrating box-framed structured units arranged to provide a corridor.

FIG. 13A depicts a tier of the system 2, wherein units 10 are constructed in a box-framed structure 154. These box-framed units 10 are similar to the units previously discussed in regards to orientation, attachment and sealing properties within the system, but have additional features as will be discussed. The unit 10 is defined by substantially parallel transverse sides 16 forming the ends 18, which are separated by substantially parallel long-axis sides 14. The box-framed structures 154 of the units 10 can be detachably combined along the transverse sides 16 of paired units, or by connecting the traverse side 16 of one unit to the long-axis side 14 of a second unit. The combination of two units creates a seal 156 at the contact of the two units, providing a controlled environment within the system, e.g. managing the transmission of particles in and out of the system, airflow control within the system, and/or temperature control within the system. The units 10 are combined to create sections 4 and support sections 6. The sections 4 and support 6 can be combined to create tiers, wherein the combination of a section 4 and support section 6 provides for the seal 156 and seal features as described. FIG. 13B depicts box-framed units arranged to provide for a corridor 40' within the section 4. Additionally units 10 may be arranged to provide for a unit 10 based construction of the corridor 90 within the support section 6.

Figure 14:
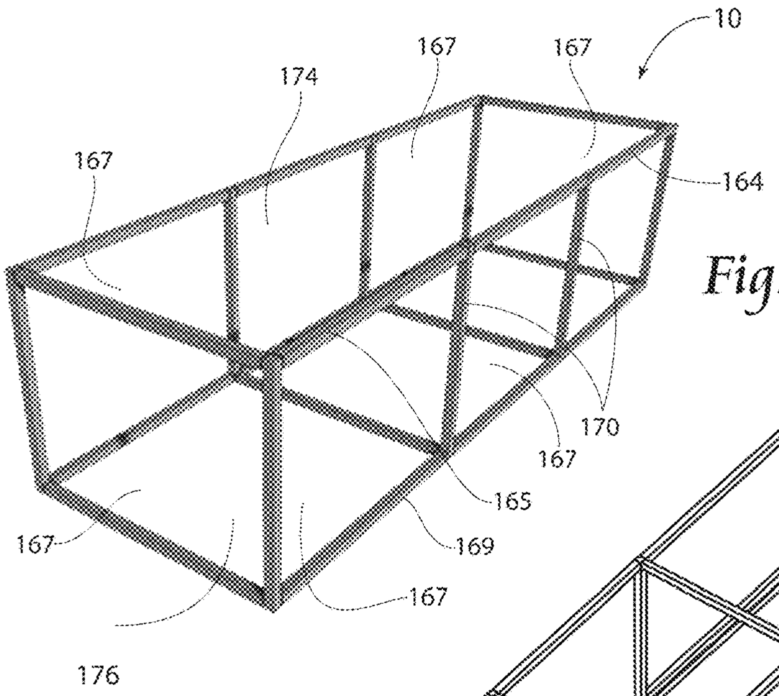
FIG. 14 is a perspective view of the box-framed structured unit.

FIG. 14 depicts the box-framed structure 154 of the unit 10. The dimensions of the unit 10, i.e. height, width and length, are defined by the frame 164. The frame 164 occupies and defines the connection locations 165 between the boundary planes 167 of the unit 10. The boundary planes 167 help define the volume occupied by the unit 10. The frame 164 is made of beams 169. The frame defines an outer perimeter of said unit, and an outer perimeter if each side if the unit. Further, with the boundary planes as open areas, the units are opened sided box-framed units.

Along the long-axis sides of the unit 10, substantially vertical beams 169 extend from the bottom 176 of the unit 10 to the top 174 of the unit 10. A third beam 169 extends between the long-axis side vertical beams on opposing long-axis sides of the unit along the bottom 176. This arrangement of the two vertical beams and the connecting beam on the bottom 176 creates a u-shape rib 170 along the long-axis side of the unit providing additional structural support to the box-framed structured 154 unit 10.

Figure 15:
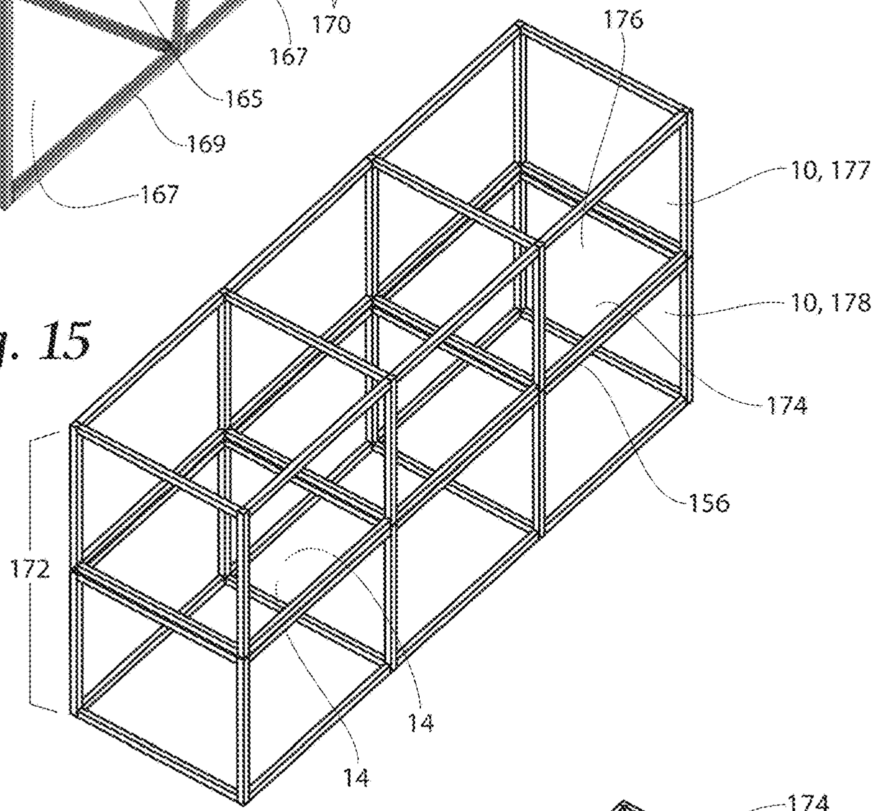
FIG. 15 is a perspective view of two box-framed structured units in a stackable arrangement.

FIG. 15 shows box-framed structured units sealably 156 arranged in a stackable 172 arrangement. In this arrangement, a first box-shaped unit 177 is arranged on top of a second box-shaped unit 178. The frame 164 of the bottom 176 of the first unit 177 is in sealable 156 contact with the frame 164 of the top 174 of the second unit 178. This arrangement allows for multiple floored systems or a single floor area with higher ceilings than a single unit 10. The ability for the units to be stacked also is advantageous, as this allows more efficient transportation of the units, as multiple units can be carried on a flatbed truck.

Figure 16:
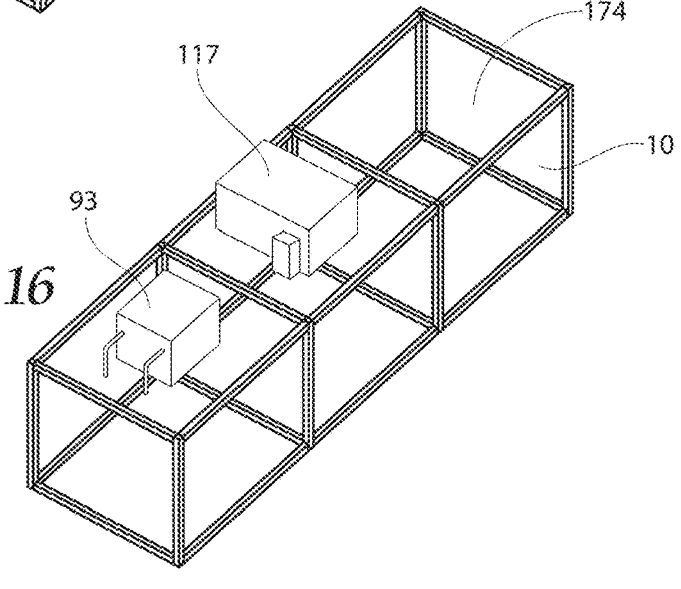
FIG. 16 is a perspective of the box-framed structured unit, illustrating locations of support systems.

FIG. 16 shows support systems, e.g. 93, 117, positioned on the top 176 of the box-framed structured 154. Alternatively, the support systems, e.g. 93, 117, may be attached to the sides of the unit 10 or as previously described in this application.

Figure 17:
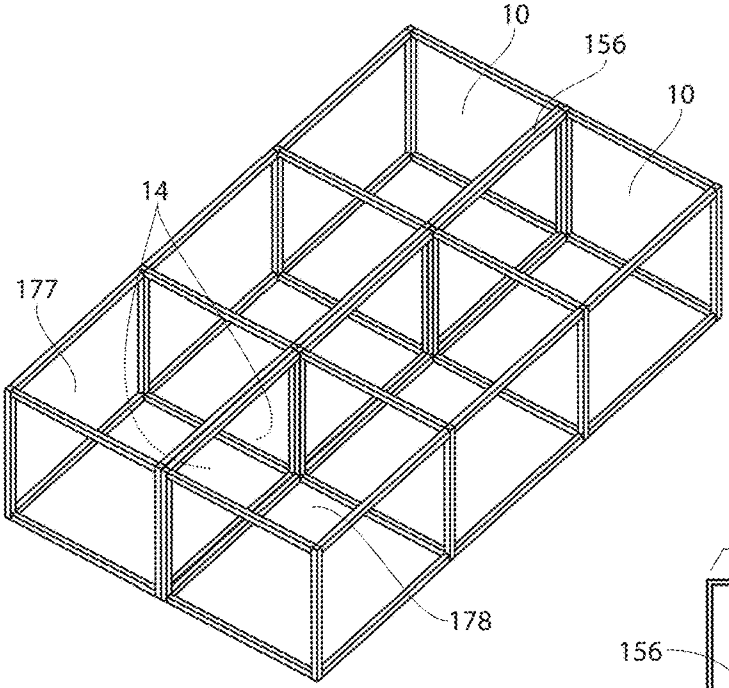
FIG. 17 is a perspective view of two box-framed structure units is a side-by-side arrangement.
Figure 18:
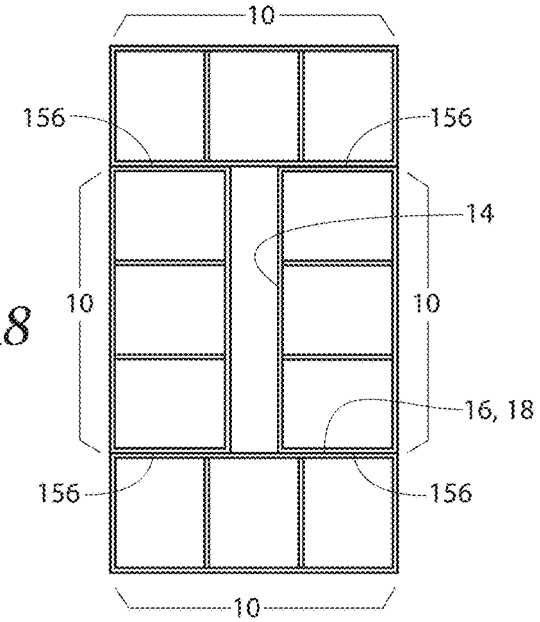
FIG. 18 is a top view of the system illustrating a sixth orientation.

As depicted in FIG. 17, box-framed structured units can be sealably 156 arranged in a side-by-side arrangement. In this arrangement a first box-shaped unit 177 is arranged on next and contacting a second box-shaped unit 178. The units (177, 178) are sealably connected along their respective long-axis sides 14. This arrangement allows for parallel partitioned units or a single room space having a larger floor space than the floor space of the unit 10 as previously described. FIG. 18 depicts a sixth orientation of the system, with the seal 156 between the units 10 formed between a respective traverse side of one unit 10 and the long-axis side of the second unit 10. The arrangement provides for a central hallway between the various patient rooms.

FIGS. 17 and 18 demonstrate the adaptability and flexibility of tailoring the present invention to a particular situation. If more patient rooms are needed in certain situations, further units may be positioned as described above in an abutting fashion to form a seal and maintain a controlled environment. Likewise, if more support rooms or areas such as corridors are to be used, the modular units of the present invention, particularly the units as described in FIGS. 14-18, allow for quick and efficient arrangement and rearrangement of a hospital system.

Figure 19:
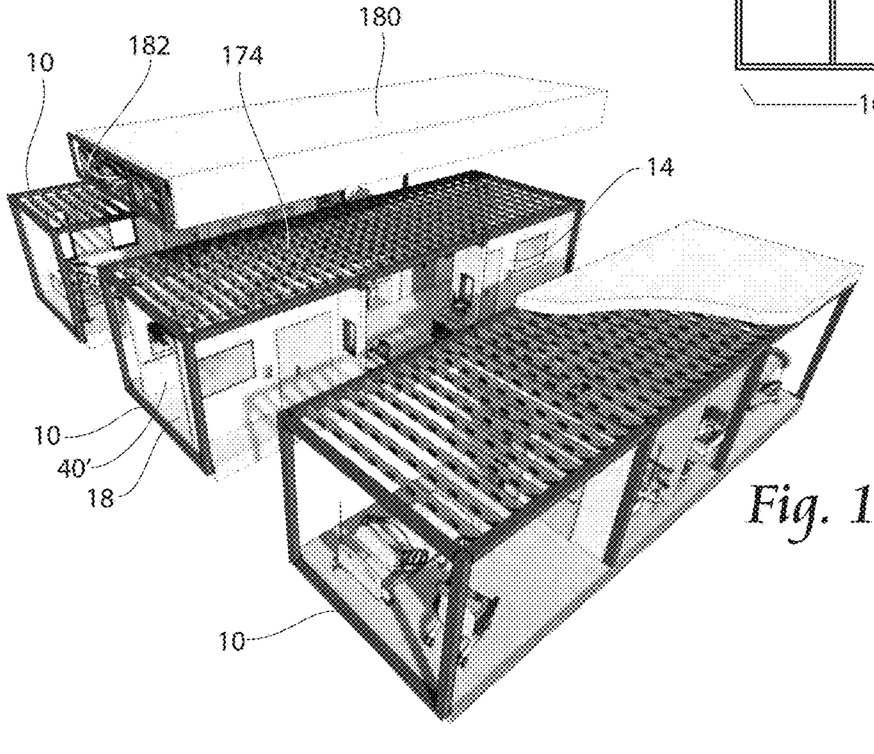
FIG. 19 is an exploded view of a section of the system, illustrating an enclosure for housing support systems.

FIG. 19 depicts a portion of the section 4. An enclosure 180 is in contact with the top 174 of at least one unit 10. The enclosure 180 extends above the unit 10 and not within unit 10. The enclosure has a length which is in substantial alignment with the long-axis side 14 of the unit 10 on which the enclosure 180 resides, and extends at least substantially the length of at least one unit 10. Alternatively, the enclosure 180 extends less than the length of one unit 10. The enclosure is a support system module and houses the supports systems, environmental systems (93, 117), and related tubing and components, of the system. The support systems are housed within an enclosure cavity 182 which the enclosure defines when it is in contact with the top 174 of the unit 10. Housing the support systems within the enclosure cavity 182 removes these support systems, or at least part of these support systems, from the units 10. This allows for increased volume space in the units 10 as compared to the prior art and to variations of the units having all or part of the support systems housed within the units 10. This increased volume space amounts to increased vertical clearance as compared to the vertical clearance in the prior art and in units 10 housing the support systems. The increased vertical clearance can allow for additional storage, equipment, and occupants of varying heights. The enclosure 180 may be positioned above any unit 10 within the system.

It should be understood that the use of any orientation or directional terms herein is not intended to imply only a single orientation of the item with which it is associated or to limit the present disclosure in any manner. The use of such orientation or directional terms is intended to assist with the understanding of principles disclosed herein.

It should also be understood that use of numerical terms should not be interpreted to imply an order or sequence of components or functions. Moreover, use of these numerical terms is not intended to pertain to only the component and/or function with which they are utilized. Rather, the use of these numerical terms are merely used to assist the reader with understanding the subject matter of the present disclosure.

The present invention has optimized the efficiency of patient care, provided greater options in building layout for expanded healthcare units, and reduced the costs associated with expanding patient care. The units of the present invention are configurable along a transverse axis of the unit allowing for optimized use of space. Additionally, the units are combined without the need for a locking mechanism. This allows the system to be expandable. The units are transportable upon a tractor-trailer flatbed, airplane or train car reducing transportation cost per unit. Finally, the system is a separate unit, which is stand alone or attached to an existing structure, and therefore has specific locations for personnel to immediately access personal protection features.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A modular configurable multi-purpose system, said system comprising:

a plurality of units having a box frame, said box frame comprising
- a base,
- a footing member located near said base,
- a top,
- a head member located near said top;
- a plurality of support beams extending from said footing member to said head member;
- said box frame forming at least one doorway;
- said units further comprising
  - a pair of individual subsections, wherein at least one of the subsections comprises a patient care subsection;
  - a hallway located between said subsections and connected to said doorway;
- wherein each of said units securely abutting an adjacent units in a secure fashion, thereby providing a seal therebetween, the seal being defined by the abutment of the adjacent units, said seal being maintained without the use of fastening mechanisms;
- wherein said doorway of one of said units being aligned with said doorway of another thereby providing access between each of the units of the system;

wherein the secure abutment of each of the adjacent units in the modular systems provides for a controlled environment of operation, which includes arresting and managing the movement of airborne and non-airborne particles into and out of the system.

2. The system according to claim 1, wherein said frame of each of said unit defines an outer perimeter of said unit.

3. The system according to claim 1, wherein each of said unit comprises two long axis sides separated by two transverse sides.

4. The system according to claim 3, wherein at least one of said seals between a pair of adjacent units is formed by the abutment of said transverse side of said first unit and said long axis side of said second unit to form at least one of multiple rooms and a single room.

5. The system according to claim 3, wherein at least one of said seals between a pair of adjacent units is formed by the abutment of said respective transverse side of each of said respective units.

6. The system according to claim 3, wherein at least one of said seals between a pair of adjacent units is formed by the abutment of said respective long axis side of each of said respective units.

7. The system according to claim 1, wherein at least one of said units is a patient unit, an education unit and an all-purpose unit.

8. The system according to claim 1, wherein said units are separable from one another and transportable.

9. The system according to claim 1, wherein said units are stackable to provide a multi-storied environment having said seal.

10. The system according to claim 1, wherein at least one of said units further comprises:

at least one environmental system for said unit positioned along an exterior surface of said unit, with said exterior surface defined by said box-frame.

* * * * *